(12) United States Patent
Fujita

(10) Patent No.: US 6,388,694 B1
(45) Date of Patent: *May 14, 2002

(54) METHOD FOR CALCULATING THE OUTPUT CHARACTERISTIC OF AN OPTICAL TIP ARRAY AND IMAGE FORMING APPARATUS

(75) Inventor: Atsushi Fujita, Kusatsu (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,904

(22) Filed: Dec. 18, 1997

(30) Foreign Application Priority Data

Dec. 19, 1996 (JP) .............................. 8-340119
Dec. 19, 1996 (JP) .............................. 8-340121

(51) Int. Cl.⁷ .............................. B41J 2/435; B41J 2/47
(52) U.S. Cl. ...................... 347/236; 347/240; 347/246; 347/251
(58) Field of Search ................................. 347/236, 237, 347/238, 240, 251, 253, 130, 246, 247; 355/38; 358/298, 300; 382/241; 250/205; 396/563

(56) References Cited

U.S. PATENT DOCUMENTS

| | | | | |
|---|---|---|---|---|
| 4,455,562 A | | 6/1984 | Dolan et al. ................. 347/130 |
| 4,707,118 A | * | 11/1987 | Terashita ...................... 355/38 |
| 4,713,672 A | * | 12/1987 | Horihata et al. ............. 347/246 |
| 4,716,285 A | * | 12/1987 | Konishi ....................... 250/205 |
| 4,998,118 A | * | 3/1991 | Ng .............................. 347/236 |
| 5,051,762 A | * | 9/1991 | Lea ............................. 396/563 |
| 5,200,765 A | * | 4/1993 | Tai .............................. 347/240 |
| 5,300,960 A | | 4/1994 | Pham et al. ................. 347/130 |
| 5,491,506 A | * | 2/1996 | Yagishita et al. ........... 347/246 |
| 5,694,223 A | * | 12/1997 | Katori et al. ............... 358/300 |
| 5,699,103 A | * | 12/1997 | Fleming ..................... 347/240 |
| 5,917,534 A | * | 6/1999 | Rajeswaran ................ 347/238 |

FOREIGN PATENT DOCUMENTS

JP              63-272568              10/1988

* cited by examiner

*Primary Examiner*—Hai Pham
(74) *Attorney, Agent, or Firm*—McDermott, Will & Emery

(57) ABSTRACT

An optical write head which drives a plurality of light shutter elements arranged in a main scanning direction individually to write a multi-tone image on a recording medium. Prior to the image writing, while the light shutter elements are driven for reproduction of tone levels of 0, 48, 160 and 240, the quantities of light outputted from each of the elements are measured with a sensor, and from the measured values, an approximate expression indicating the output characteristic of each of the elements is calculated. The difference between the recording medium and the sensor in spectral sensitivity is made up, for example, by changing the intensity of light of each of the three primary colors emitted from a lamp by switching the voltage applied to the lamp between at the time of measurement and at the time of exposure or by changing the sensitivity of the sensor in receiving each of the three primary colors by switching the accelerating voltage applied to the sensor.

26 Claims, 25 Drawing Sheets

F I G. 1
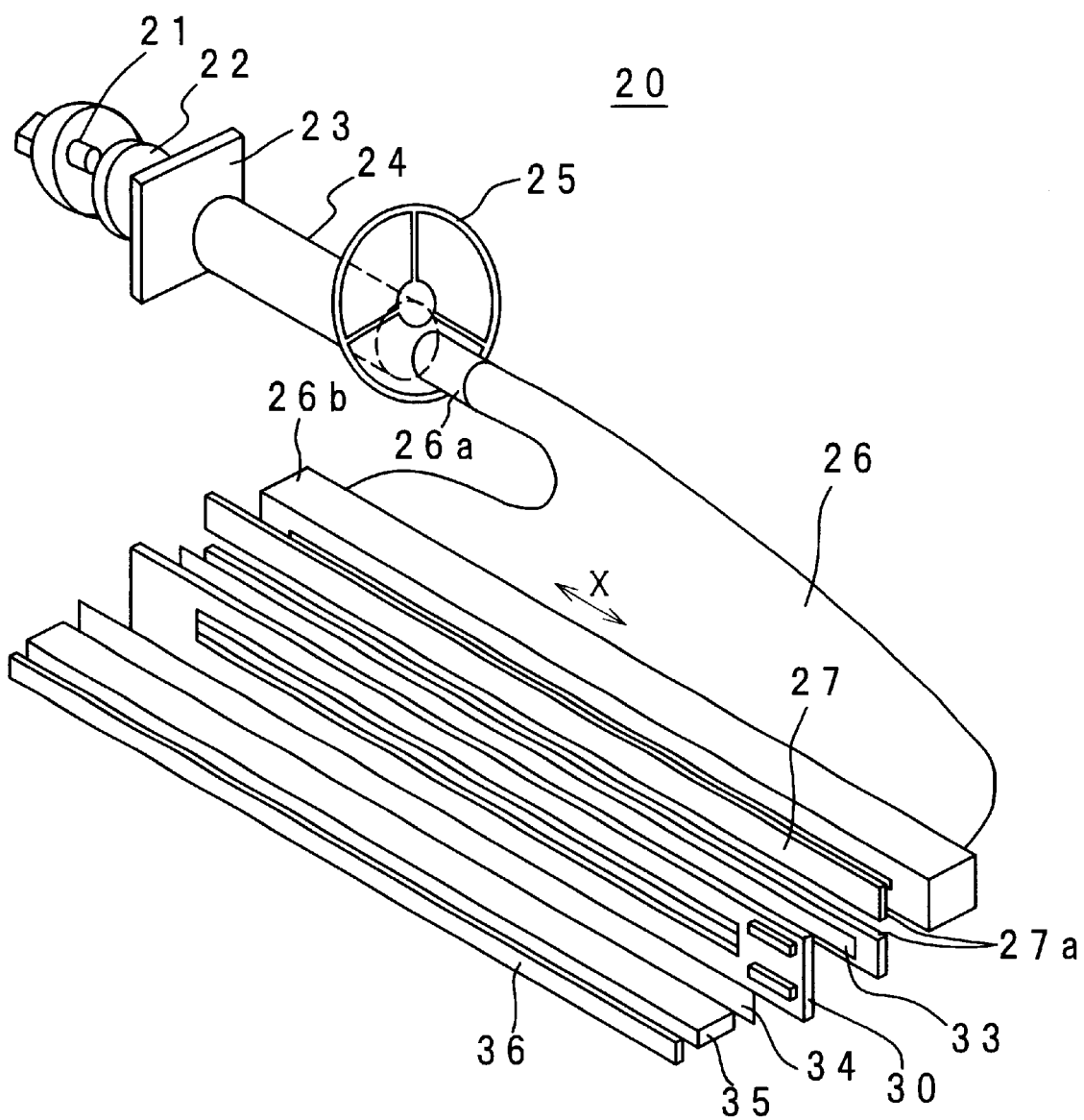

F I G. 2
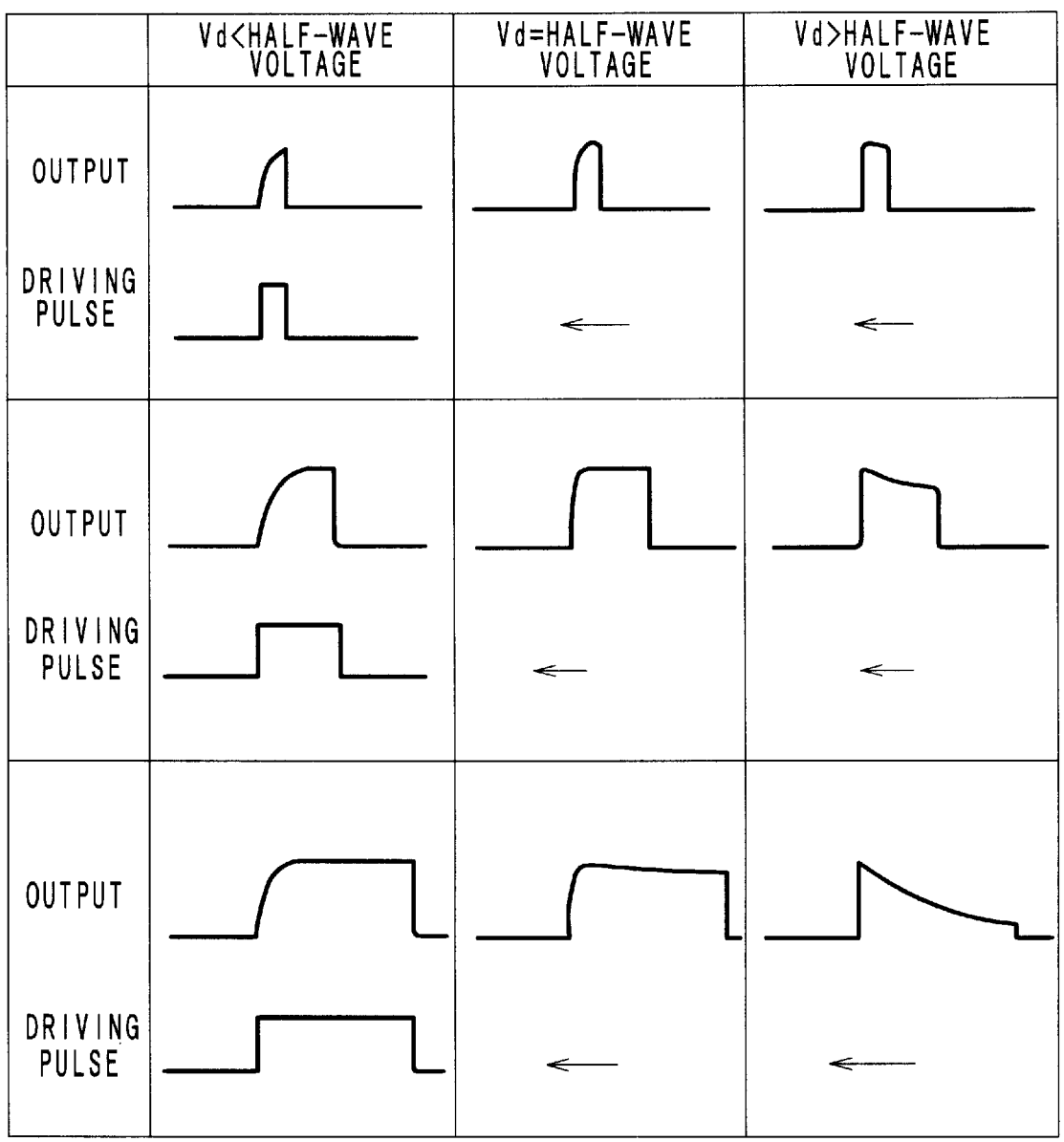

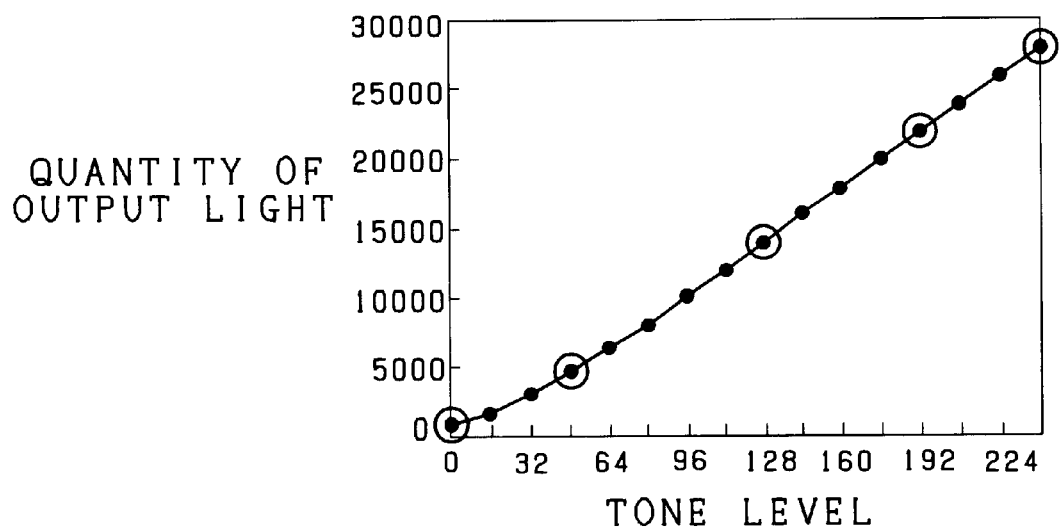
FIG. 10 MEASURED AT 5 TONE LEVELS (0, 48, 128, 192, 240)
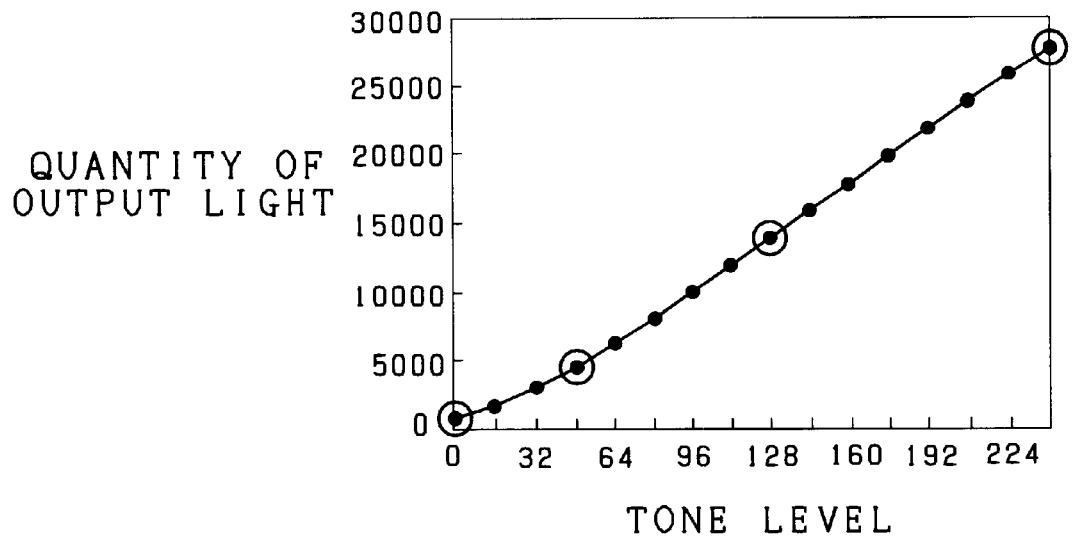
FIG. 11 MEASURED AT 4 TONE LEVELS (0, 48, 128, 240)

F I G. 1 2
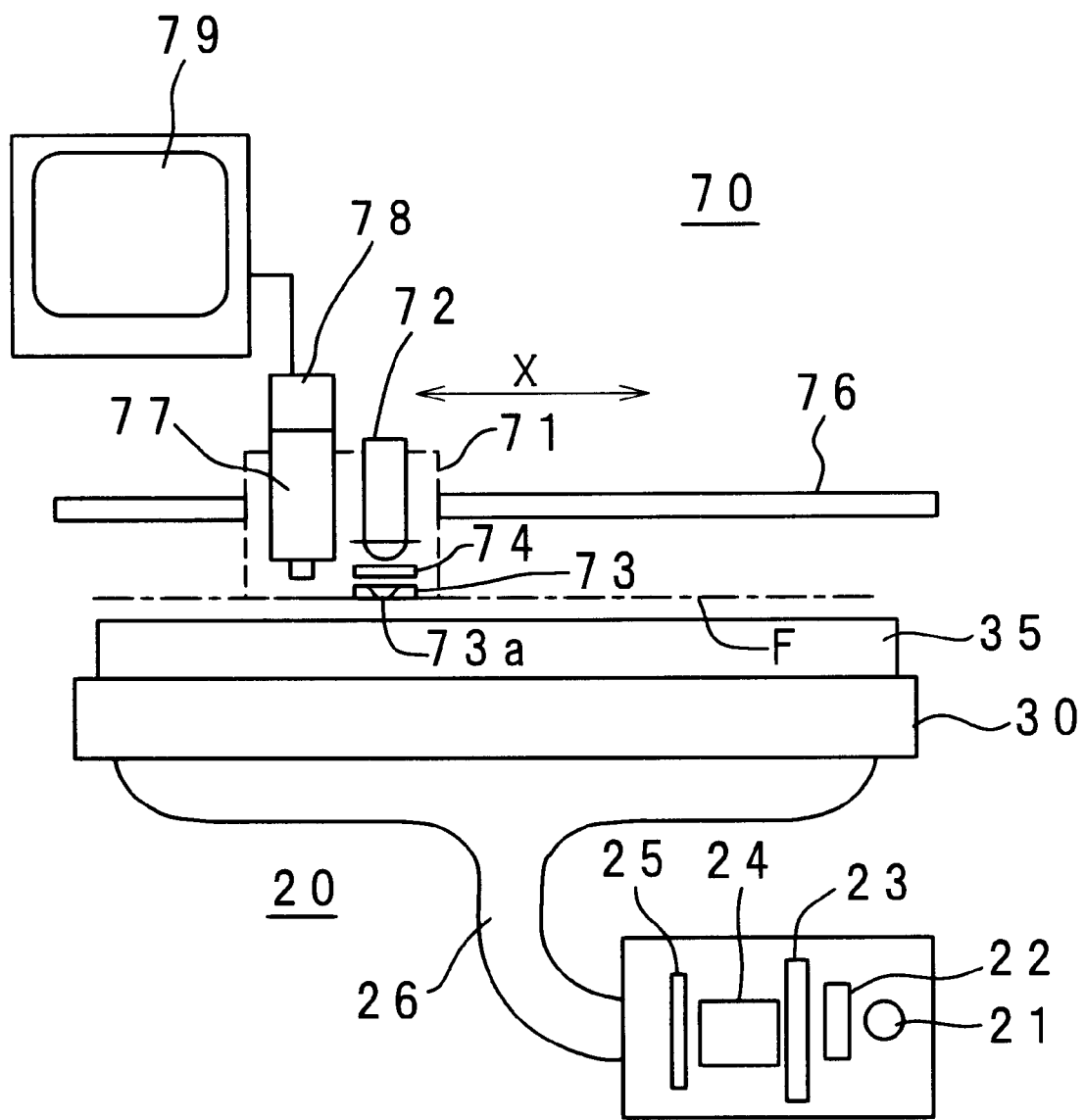

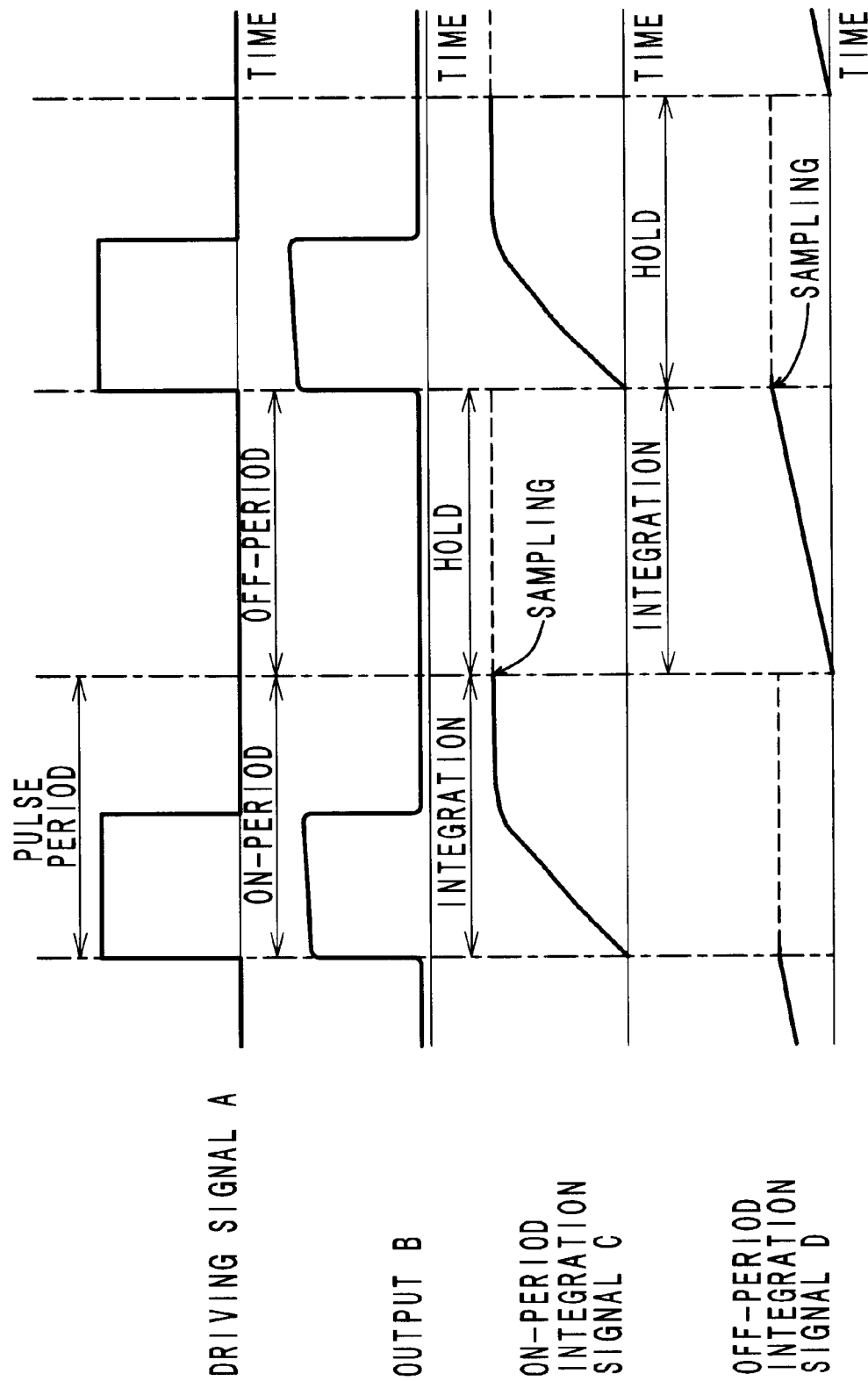

F I G. 23
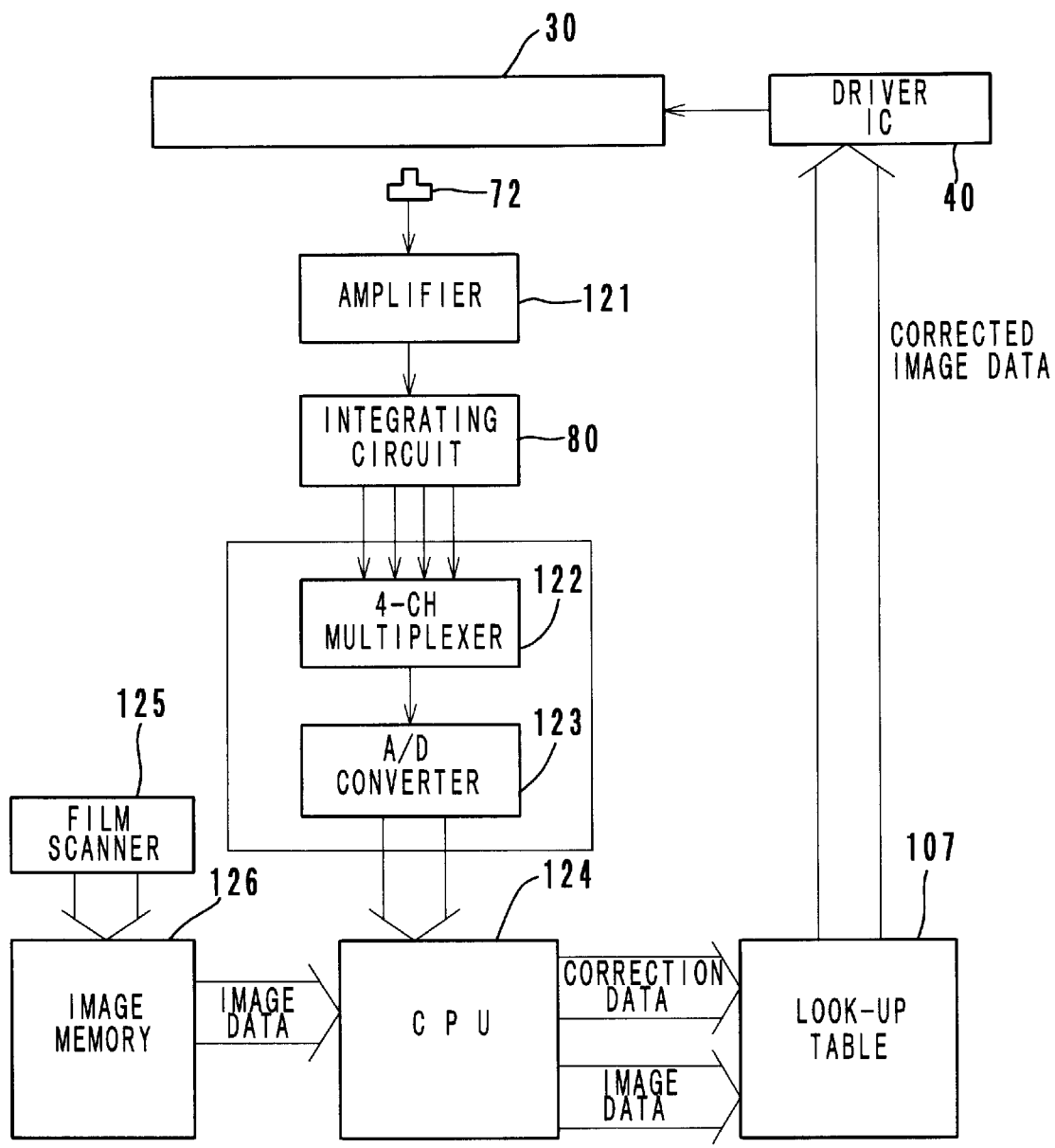

METHOD FOR CALCULATING THE OUTPUT CHARACTERISTIC OF AN OPTICAL TIP ARRAY AND IMAGE FORMING APPARATUS

BACKGROUND OF THE INVENTION

1. Field of the Invention

The present invention relates to a method for calculating the output characteristic of an optical tip array which forms an image (latent image) on a recording medium with a light shutter array made of PLZT or an LED array and to an image forming apparatus.

2. Description of Related Art

Conventionally, various kinds of optical write heads which turn on and off light for each pixel with use of a light shutter array made of PLZT or an LED array have been used to form images (electrostatic latent images) on a silver-salt print sheet or film or an electrophotographic photosensitive member. For formation of images without unevenness, such an optical write head needs to be subjected to measurement of the quantity of light outputted from each element and to correction in quantity of light according to the measurement result.

Meanwhile, for formation of a multi-tone image, it is effective to modulate the pulse width of a driving signal which is supplied to the elements. However, since the elements vary in output characteristic, it is difficult to carry out an accurate light-quantity correction to each of the elements. The variation in output characteristic among the elements seems to be caused by distortion and errors in the measurements of PLZT tips which occur in the manufacturing processes. Because of the variation in output characteristic, for example, when 512 elements are supplied with an identical driving voltage, the quantities of light outputted from the elements vary in an extent of ±15% to ±20%. Further, because of the variation in shape among the elements, the elements vary in half-wave voltage (a voltage to make an element emit a maximum quantity of light). Accordingly, the output characteristic of each element while the pulse width applied thereto is modulated for reproduction of a plurality of tone levels is peculiar to the element itself.

Conventionally, while the elements are driven under a specified condition (a condition to reproduce one tone), the quantity of light outputted from each of the elements is measured, and correction data are produced based on the results. However, the correction data do not reflect the actual output characteristics of the elements, and accurate corrections cannot be made.

Moreover, since the spectral sensitivity characteristic of the photosensor for light-quantity measurement such as a photomultiplier is different from that of the recording medium such as a print sheet or film, light-quantity correction data produced based on the results of the measurement do not agree with the spectral sensitivity characteristic of the recording medium, thereby resulting in failure in formation of a quality image.

SUMMARY OF THE INVENTION

An object of the present invention is to provide an image forming apparatus which can reproduce a multi-tone image on a recording medium accurately.

Another object of the present invention is to provide a method for calculating the output characteristic of each element of an optical write device accurately based on results of light-quantity measurement carried out at only several tone levels.

Further, another object of the present invention is to provide an optical write device which can match correction data produced based on the results of light-quantity measurement carried out by a sensor to exposure of a recording medium for formation of a quality color image even if the spectral sensitivity characteristic of the sensor is different from that of the recording medium.

In order to attain the objects above, according to the present invention, a method for calculating the output characteristic of each element of an optical write device which drives a plurality of optical elements arranged in a main scanning direction individually in accordance with multi-tone image data comprises the steps of: measuring the quantities of light outputted from each of the optical elements while driving the optical elements for reproduction of at least three different tone levels; and calculating an approximate expression which indicates the output characteristic of each of the optical elements from the measured values.

According to the present invention, the output characteristic of each of the optical elements is calculated from the results of light-quantity measurement which is carried out at the light-quantity levels for three to five tone levels. The approximate expression calculated in the method indicates the output characteristic with an extremely small error, and accurate light-quantity correction data can be produced from the expression. Consequently, a quality image without unevenness can be formed. In this method, because the characteristic of each element in reproducing different tone levels itself is simulated, accurate correction data can be produced from the calculated expression even if the driving voltage for the measurement varies. Further, since during the light-quantity measurement, the optical elements are driven for reproduction of only several tone levels, it is not necessary to provide a large-scale expensive circuit for the measurement, and driver ICs for two-value image formation which are modified for the measurement can be used.

According to the present invention, the number of tone levels at which light-quantity measurement is carried out depends on the form of the approximate expression to be calculated. For example, if a quadratic expression is to be calculated, the quantities of light outputted from each element which is driven for reproduction of at least three tone levels are measured, and if a cubic expression is to be calculated, the quantities of light outputted from each element which is driven for reproduction of at least four tone levels are measured. By carrying out light-quantity measurement at tone levels near points of inflection of the actual output characteristic of each of the optical elements, an expression which indicates the output characteristic more accurately can be calculated. Further, prior to the light-quantity measurement, a voltage which makes many of the optical elements output their respective maximum quantities of light at a duty of 50% is found out, and the voltage is applied to the optical elements during the light-quantity measurement. Based on the results of the measurement, correction data with small errors with respect to all the optical elements can be produced.

Further, the present invention relates to an optical write device which drives a plurality of optical elements arranged in a main scanning direction individually in accordance with data about three primary colors to write an image on a recording medium, and the device according to the present invention comprises: light-quantity measuring means which has a photosensor for measuring the quantity of light outputted from each of the optical elements; and adjusting means which makes up the difference in spectral sensitivity characteristic between the photosensor and the recording medium.

In the structure, the spectral sensitivity of the photosensor and that of the recording medium are made clear beforehand, and the difference between the photosensor and the recording medium in spectral sensitivity characteristic is made up at the time of light-quantity measurement and/or at the time of exposure of the recording medium by the adjusting means. The adjusting means is a color switching filter and/or a color correction filter provided in a light source section, means for switching the intensity of light emitted from the light source (for example, voltage switching means) or means for switching the sensitivity of the photosensor (for example, means for switching the accelerating voltage applied to a photomultiplier used as the photosensor, means for switching the amplifying constant for the output signal of the photosensor).

Thus, since the difference between the recording medium and the photosensor in spectral sensitivity characteristic is made up, correction data which are produced based on light-quantity measurement by use of the photosensor matches exposure of the recording medium, thereby resulting in formation of a quality color image.

An image forming apparatus according to the present invention comprises: at least one light emitter; a driver which is connected to said light emitter so as to drive said light emitter in accordance with driving image data; a light-quantity detector which detects quantities of light emitted from the light emitter, the light-quantity detector detecting a plurality of quantities of light emitted from the light emitter which is driven for reproduction of different tone levels; and a controller comprising a first control section which calculates an approximate output characteristic of the light emitter based on the quantities of light detected by the light-quantity detector and which stores the approximate output characteristic in a memory, and a second control section which inputs image data and generates the driving image data based on the inputted image data and the approximate output characteristic stored in the memory.

BRIEF DESCRIPTION OF THE DRAWINGS

These and other objects and features of the present invention are apparent from the following description with reference to the accompanying drawings, in which:

FIG. 1 is a perspective view of an optical write head to which the output-characteristic calculating method according to the present invention is applied;

FIG. 2 is a chart showing output waveforms of a light shutter element while the pulse width of a driving signal supplied to the light shutter element is modulated.

FIGS. 4 through 11 are graphs which show approximate output characteristic curves of a light shutter element calculated by the method according to the present invention and the actual output characteristic curve of the element;

FIG. 12 is a schematic view of a light-quantity measuring device;

FIG. 13 is a chart showing waveforms of analog signals during light-quantity measurement;

FIG. 23 is a block diagram of a control section of the color printer;

DETAILED DESCRIPTION OF THE PREFERRED EMBODIMENTS

Figure 3A:
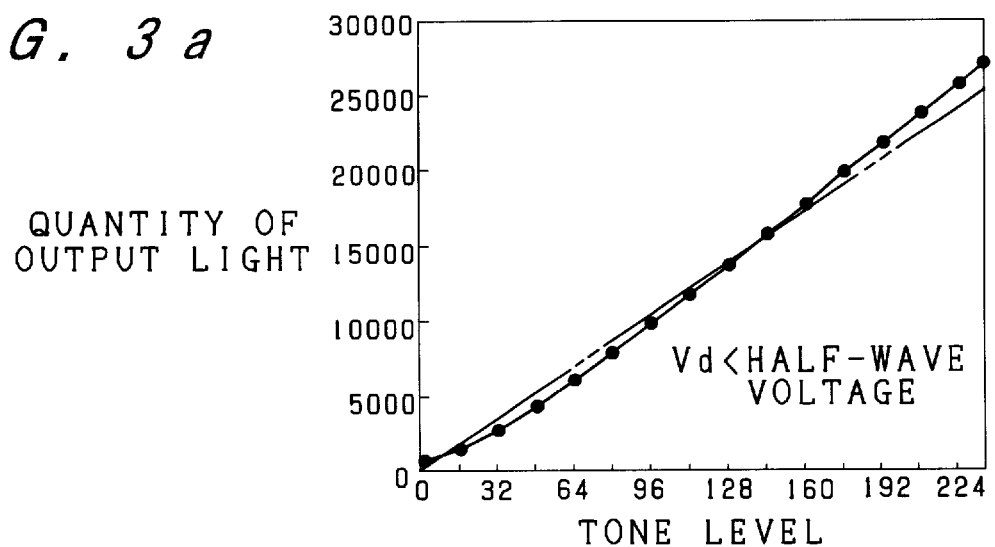
FIGS. 3a, 3b and 3c are graphs which show the output characteristics of light shutter elements.

Some exemplary methods of calculating the output characteristic of an optical tip array and exemplary image forming apparatuses according to the present invention are described with reference to the accompanying drawings.

Optical Write Head

FIG. 1 shows an optical write head 20 which is used to write full-color images on a silver-salt print sheet. This optical write head 20 mainly comprises a halogen lamp 21, a heat insulating filter 22, a color correction filter 23, a light dispersing cylinder 24, an RGB filter 25, an optical fiber array 26, a slit plate 27, a light shutter module 30, an imaging lens array 35 and a dust protective glass 36.

The heat insulating filter 22 cuts the infrared component of light emitted from the halogen lamp 21, and the color correction filter 23 controls the light in quality so that the light will match the spectral sensitivity characteristic of the print sheet. The light dispersing cylinder 24 is to improve the efficiency of use of light and to suppress the unevenness in quantity of light. The RGB filter 25 is driven to rotate in synchronization with image writing by the light shutter module 30, which will be described later, and transmits different colors line by line.

The optical fiber array 26 is composed of a large number of optical fibers. The optical fibers are bundled at one end 26a, and the end 26a faces the dispersing cylinder 24 with the RGB filter 25 in-between. The optical fibers are aligned to extend in a main scanning direction indicated by arrow X at the other end 26b, so that light is emergent from the optical fiber array 26 linearly. The slit plate 27 has mirror surfaces 27a so as to guide the light emergent from the optical fiber array 26 to the light shutter module 30 efficiently. Further, a heater (not shown) is provided to the slit plate 27. The heater is to maintain the temperature of PLZT shutter tips of the light shutter module 30, and the temperature control is carried out in accordance with a detection result of a thermometer (not shown) provided to the module 30.

The light shutter module 30 has an array of PLZT light shutter tips, each of which has shutter elements, on a slit of a ceramic substrate or on a glass substrate. Further, an array of driver ICs are provided in parallel to the array of PLZT light shutter tips. The light shutter elements are driven by the driver ICs in such a way that only specified pixels will be printed. Also, a polarizer 33 and an analyzer 34 are provided before and after the module 30, respectively. As is well known, PLZT is a ceramic which has an electrooptic effect at a large Kerr constant and is light-transmitting. The light is linearly polarized by the polarizer 33, and the polarization plane of the light rotates in accordance with turning-on and turning-off of electric fields caused by supplies of voltages to the light shutter elements. Consequently, the light emergent from the analyzer 34 is turned on and off part by part.

The light emergent from the analyzer 34 is focused on the print sheet via the imaging lens array 35 and the dust protective glass 36, and thus, a latent image is formed on the print sheet. The print sheet is transported in a direction (sub scanning direction) perpendicular to the main scanning direction X at a constant speed.

In the optical write head 20, depending on the structure of the driver ICs and the substrate of the light shutter module 30, all the light shutter elements are supplied with an identical driving voltage, or the light shutter elements driven by some driver ICs or by a driver IC (each of the driver ICs have a plurality of drive pads) are supplied with an identical driving voltage. When the light shutter module 30 is driven by such a driving mechanism, as is apparent from the following expression, if the lights incident to the light shutter elements have an identical wavelength and if the electric field strengths applied thereto are equal, the quantities of light emergent from the light shutter elements vary depending on the respective optical path lengths.

Figure 3B:
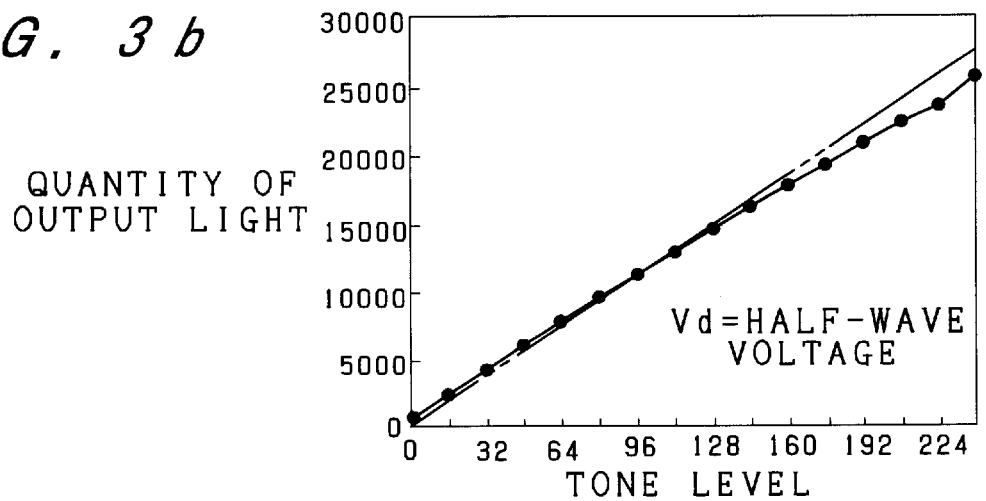
Figure 3C:
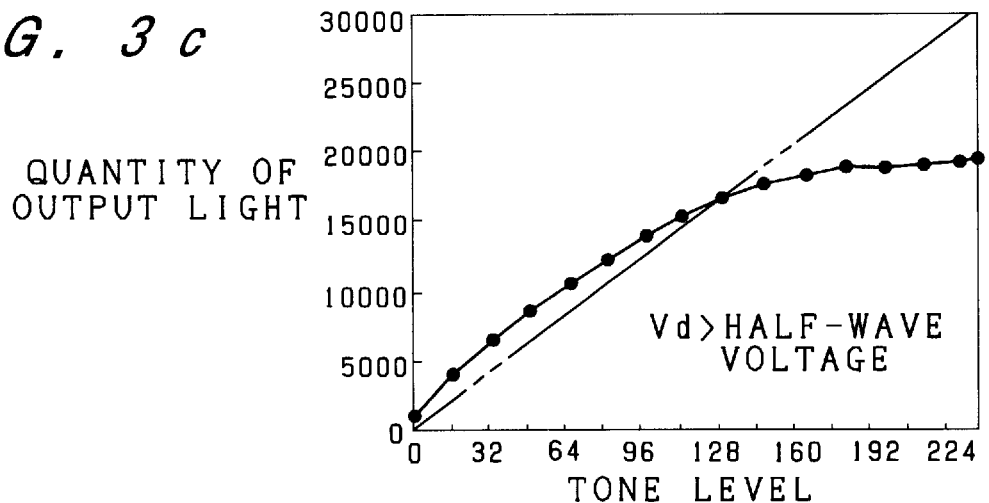

$I_0/I_i = \sin^2\{-(\pi n^3 R L E^2)/2 \lambda\}$ $I_i$: quantity of incident light
$I_0$: quantity of emergent light
n: refractive index
R: Kerr constant
L: optical path length
E: electric field strength
$\lambda$: wavelength of light Errors in processing PLZT into tips cause the optical path lengths of the light shutter elements to vary, and accordingly, the light shutter elements vary in half-wavelength voltage (a voltage to make an element output a maximum quantity of light). Each column of FIG. 2 shows output waveforms of a light shutter element while the pulse duration (pulse width) of a driving signal is altered with a constant voltage applied to the light shutter element. In the pulse-width modulation method, altering the pulse duration means altering the tone level. FIG. 2 shows the output waveforms of different light shutter elements. Column (A) of FIG. 2 shows a case wherein a voltage Vd applied to an element is lower than the half-wave voltage of the element, column (B) of FIG. 2 shows a case wherein a voltage Vd applied to an element is equal to the half-wave voltage of the element, and column (C) of FIG. 2 shows a case wherein a voltage Vd applied to an element is higher than the half-wave voltage of the element. FIGS. 3a, 3b and 3c are graphs showing the output characteristics of the elements shown by columns (A), (B) and (C) of FIG. 2, respectively.

As is apparent from FIGS. 3a, 3b and 3c, because optimal driving voltages Vd for the light shutter elements differ, the output characteristic curves of the elements are different. From experiments, it can be said that the output characteristic curve is concave when the driving voltage is lower than the half-wave voltage, is substantially linear when the driving voltage is equal to the half-wave voltage and is convex when the driving voltage is higher than the half-wave voltage. Conventionally, correction data are produced based on light-quantity measurement which is carried out while each element is driven for reproduction of one tone level. For example, when light-quantity measurement is carried out at only one tone level of 128, an approximate expression indicated by the alternate long and dash line in FIGS. 3a, 3b and 3c is obtained as correction data. However, this expression does not reflect the actual characteristic in ranges apart from the measured level. Therefore, with this expression, it is impossible to make a suitable light-quantity correction to each element, thereby resulting in formation of an image with unevenness.

Figure 4:
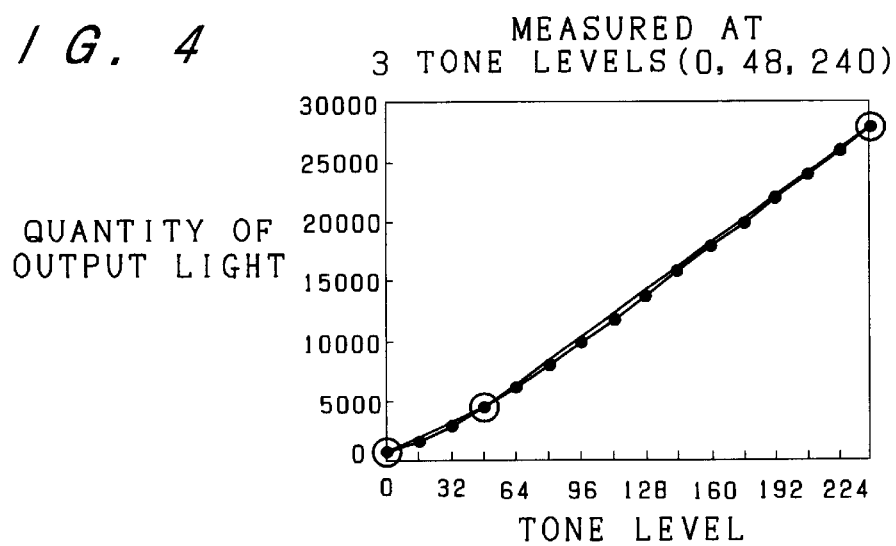
Figure 5:
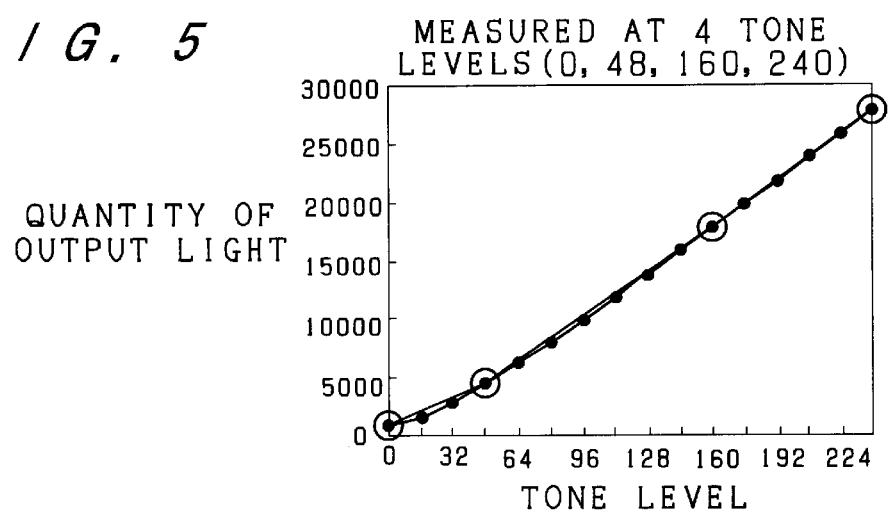
Figure 6:
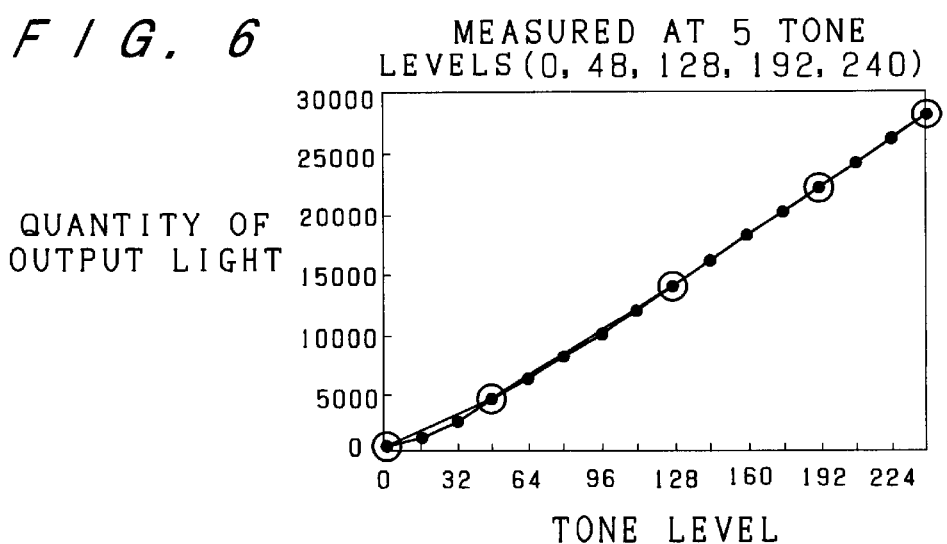
Figure 7:
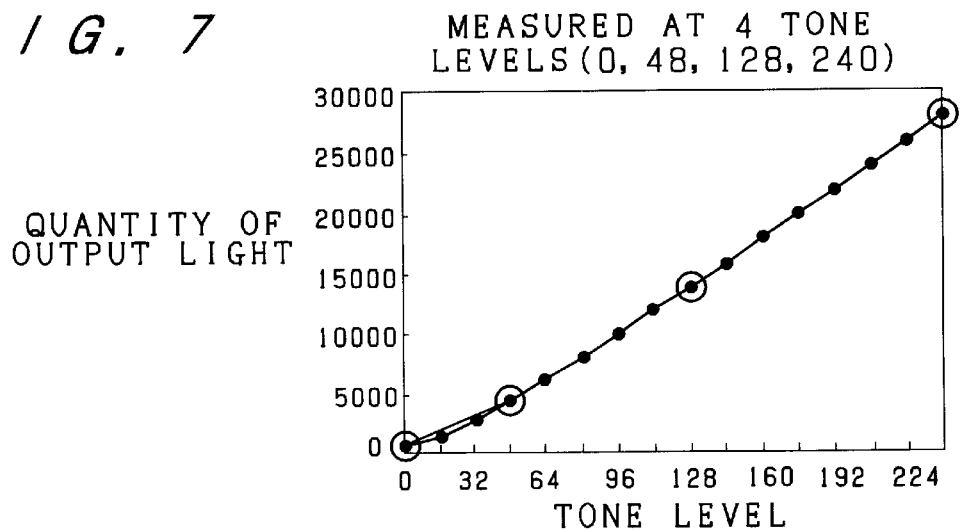
Figure 8:
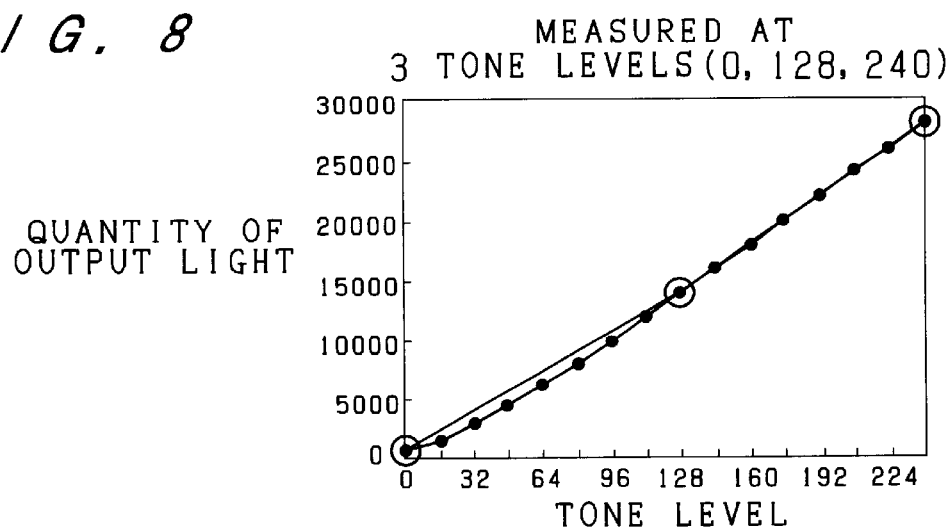
Figure 9:
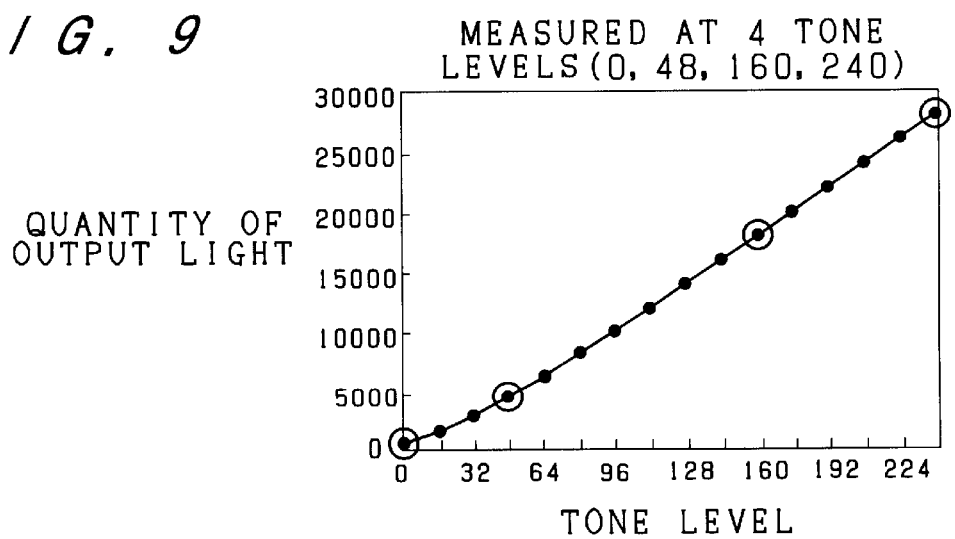

Therefore, in this embodiment, as shown in FIGS. 4 through 11, the quantities of light outputted from each light shutter element for reproduction of a plurality of tone levels are measured, and the output characteristic of each element is expressed by a plurality of lines or a quadratic or more-degree curve so that correction data with extremely small errors can be obtained. FIG. 4 shows a case wherein the output characteristic of an element is approximately expressed by lines obtained from light-quantity measurement at three tone levels (0, 48 and 240). FIG. 5 shows a case wherein the output characteristic of the element is approximately expressed by lines obtained from light-quantity measurement at four tone levels (0, 48, 160 and 240). FIG. 6 shows a case wherein the output characteristic of the element is approximately expressed by lines obtained from light-quantity measurement at five tone levels (0, 48, 128, 192 and 240). FIG. 7 shows a case wherein the output characteristic of the element is approximately expressed by lines obtained from light-quantity measurement at four tone levels (0, 48, 128, and 240). FIG. 8 shows a case wherein the output characteristic of the element is approximately expressed by a quadratic curve obtained from light-quantity measurement at three tone levels (0, 128 and 240). FIG. 9 shows a case wherein the output characteristic of the element is approximately expressed by a cubic curve obtained from light-quantity measurement at four tone levels (0, 48, 160 and 240). FIG. 10 shows a case wherein the output characteristic of the element is approximately expressed by a cubic curve obtained from light-quantity measurement at five tone levels (0, 48, 128, 192 and 240). FIG. 11 shows a case wherein the output characteristic of the element is approximately expressed by a cubic curve obtained from light-quantity measurement at four tone levels (0, 48, 128 and 240).

In each of FIGS. 4 through 11, the curve which is made by connecting the plots indicates the actual output characteristic of the element, and the curve or the lines which is/are made by connecting the circled measured values is an approximate curve (correction data). In FIGS. 4 through 11, the approximate curves indicate the actual output characteristic almost exactly. The number of tone levels to be measured depends on the equation to be calculated. For example, if a quadratic equation is to be calculated, measurement at three or more tone levels is necessary, and if a cubic equation is to be calculated, measurement at four or more tone levels is necessary. Further, in order to produce more accurate correction data, it is preferred to measure the quantities of light at tone levels which are near points of inflection of the actual output characteristic curve. Specifically, if there are reproducible tone levels of 0 through 255, by measuring the quantities of light at four tone levels of 0, 48, 160 and 240, an approximate curve with a small error can be obtained. A light shutter element whose half-wave voltage is average is focused, and for the purpose, a voltage which makes many of the elements output their respective maximum quantities of light at a duty of 50% is set as the driving voltage for the light-quantity measurement. Thereby, many of the elements show almost linear output characteristics, and correction data with minimum errors can be produced. Further, an approximate cubic equation with a small error can be calculated by using the least-square method.

Light-Quantity Measuring Device and Measuring Method

FIG. 12 shows a measuring device 70 which measures the quantity of light outputted from each light shutter element of the optical write head 20.

Figure 21:
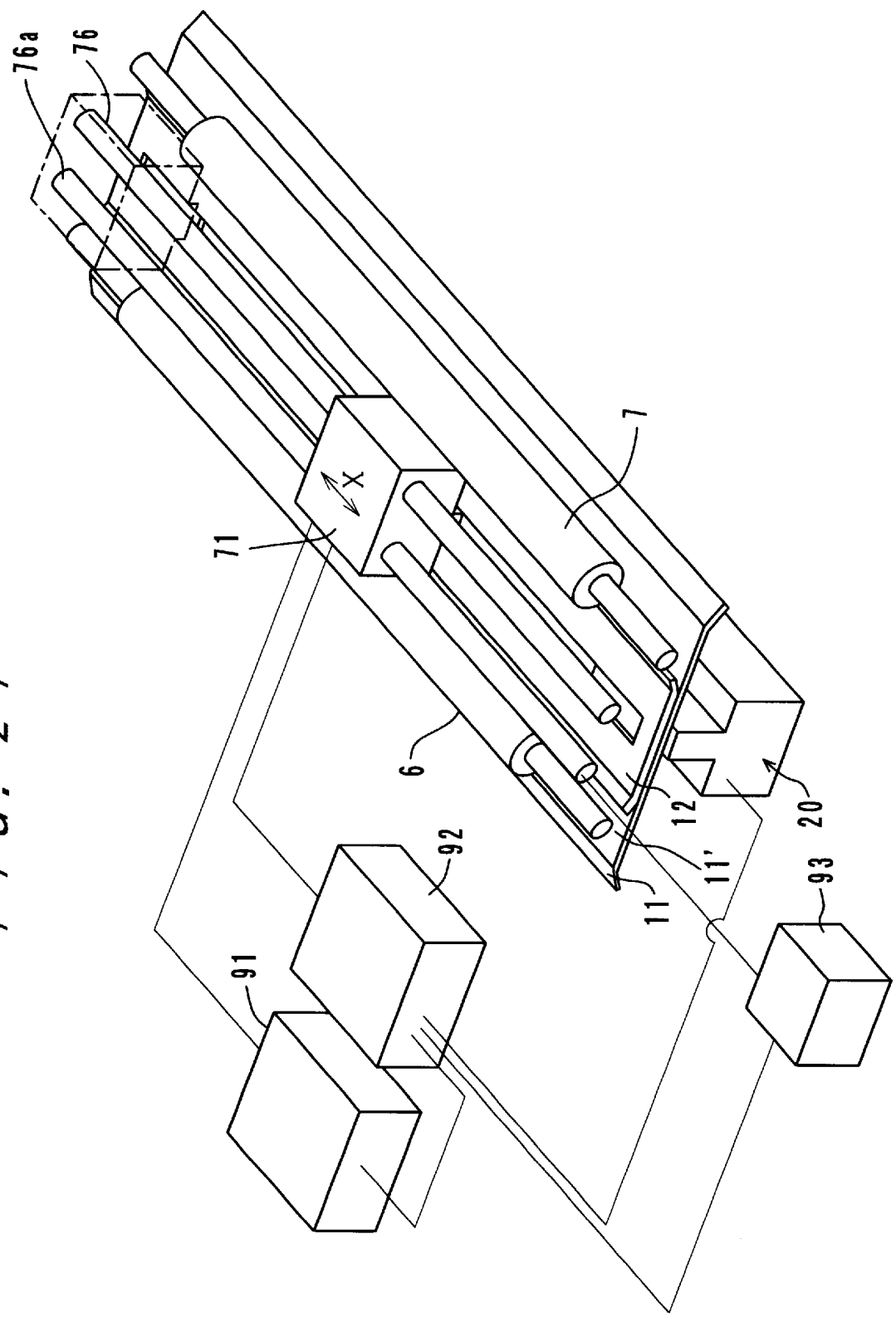
FIG. 21 is a perspective view of a light-measuring unit provided in the color printer.

In the measuring device 70, a measuring unit 71 which has a photoelectric conversion sensor 72 and a tool maker's microscope 77 is fitted to guide shafts 76 to be slidable thereon. The guide shafts 76 extend in parallel to the main scanning direction X of the light shutter module 30, and the measuring unit 71 reciprocates in the direction X at a constant speed while the sensor 72 is right above the light shutter array. Referring to FIG. 21, one of the guide shafts (76a) has a male screw on its circumference, and a nut (not shown) provided in the measuring unit 71 engages with the male screw. Accordingly, the measuring unit 71 moves reciprocally following the forward/reverse rotation of the guide shaft 76a.

By the light incidence side of the sensor 72, a slit plate 73 and a light dispersing plate 74 are provided. The slit plate 73 has a slit 73a with a width which is 25% to 400% (preferably 50% to 200%) of the width of a pixel and is located on a focal plane F of the imaging lens array 35 of the optical write head 20. The sensor 72 has a spectral sensitive characteristic substantially equal to or larger than that of the print sheet.

The tool maker's microscope 77 is integrated with a CCD camera 78. Each of the light shutter elements is photographed by the CCD camera 78 via the microscope 77 and displayed on a monitor display 79. The person in charge of this measurement adjusts the position of the optical write head 20 minutely so that the light shutter elements at both ends of the light shutter array will be positioned correctly while watching the screen of the monitor display 79. The optical write head 20 is so mounted on a table (not shown) that the height and the inclination with respect to the sensor 72 and the distance from the sensor 72 are adjustable.

The light-quantity measuring device 70 and the optical write head 20 are controlled by a sequencer so that the reciprocal movement of the measuring unit 71 can be timed to measurement of the quantity of light outputted from each light shutter element. The optical write head 20 is driven in a mode (driving frequency, duty, on/off data) which has been programmed beforehand. The measuring device 70 integrates measured values with respect to each light shutter element in synchronization with the programmed drive. Usually, in consideration of the relationship between the driving frequency of the optical write head 20 and the driving speed of the sensor 72, ten and several times of samplings/holds from each light shutter element are carried out. The output of the sensor 72 is subjected to A/D conversion and is transmitted to a control section for necessary processing.

The driving mode of the optical write head 20 for the measurement is determined in accordance with driving conditions of an apparatus which the optical write head is to be employed in. Here, a case wherein the optical write head 20 has a printing density of 400 dpi and is to be employed in a printer which is driven at a frequency of 1 kHz, that is, which has a system speed of 63.5 mm/s is described.

First, while light shutter elements which are in odd numbers in the light shutter array are driven (turned on and off repeatedly), the sensor 72 is moved forward from an initial position which is outside a scanning area. The outputs of the sensor 72 during an on-period (1 msec) are integrated, and the integrated value is sampled/held and subjected to A/D conversion and is sent to the control section. If the sensor 72 is moved at a speed of 1 mm/s, since the printing density of the optical write head 20 is 400 dpi (63.5 $\mu$m), 63.5 times of samplings/holds from each light shutter element are carried out. After moving the sensor 72 by a distance a little longer than the main scanning length, data sending to the control section is stopped, and the sensor 72 is returned to the initial position. Next, while light shutter elements which are in even numbers in the light shutter array are driven (turned on and off repeatedly), the light-quantity measurement and data input are carried out in the above-described manner. In this way, all the light shutter elements are subjected to the light-quantity measurement. It is possible to carry out the light quantity measurement of the light shutter elements which are in even numbers during the return movement of the sensor 72, and rather, this is more efficient.

An effective measuring way for light-quantity correction is to collect values from each light shutter element in four different conditions. The optical write head 20 is driven at different duties (high, middle, low and off). In this case, approximately 16 times of samplings/holds from each light shutter element in each condition of the four levels are carried out during one scan (a one-way movement of the sensor 72). It is possible to carry out the four-level light-quantity measurement during two to four scans. Also, the number of levels of the duty is not necessarily to be four.

The number of samplings/holds from each light shutter element can be increased by lowering the speed of the sensor 72 or by heightening the driving frequency of the optical write head 20. It cannot be said that there is no change in quantity of light outputted from each light shutter element with a change in driving frequency of the optical write head 20. However, the change is small enough to be allowable. If the correlation between the driving frequency and the quantity of light is made clear beforehand, the change in quantity of light with a change in driving frequency can be handled by using a correction coefficient.

If the optical write head 20 is a type which can write full-color images, such measurement must be carried out with respect to each light color (R, G and B). Accordingly, in this case, the above-described measuring process is repeated three times while the light color is switched by the RGB filter 25.

In the control section, with respect to each light shutter element, the maximum value and the minimum value are found out from the inputted data, and the address of the element is figured out from these values. Then, as described above, with respect to each light shutter element, measured quantities of light at the four levels are expressed by an approximate cubic curve, and correction coefficients at respective levels (for example, 0 through 255 tone levels) are determined.

Figure 14:
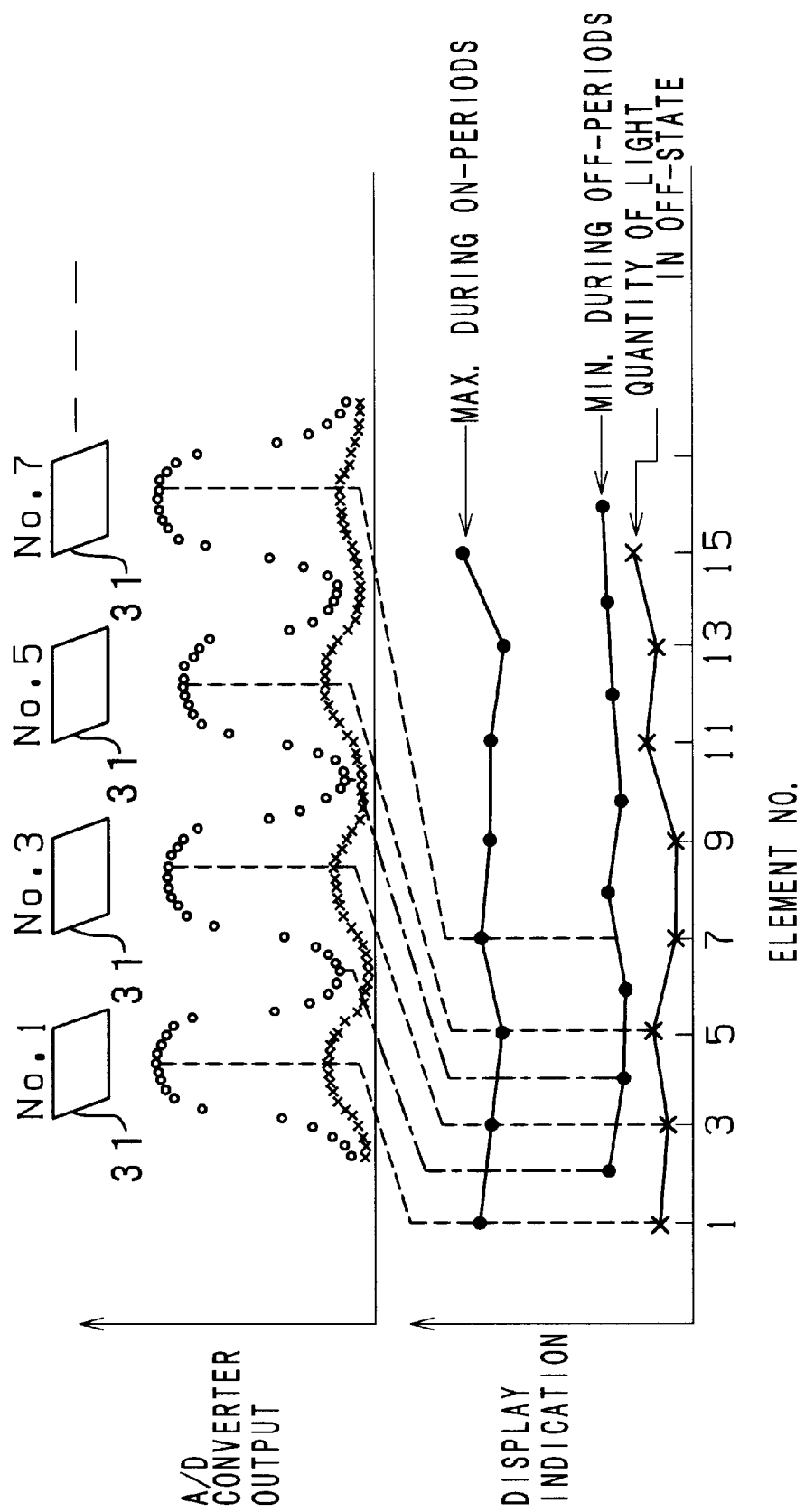
FIG. 14 is a chart showing waveforms of digital signals during the light-quantity measurement.

Next, referring to FIGS. 13 and 14, the principle of the light-quantity measurement is described.

First, a driving signal A is applied to light shutter elements which are in odd numbers in the light shutter array. The driving signal A has a frequency and a duty which are equal or nearly equal to the driving conditions of an apparatus which the optical write head 20 is to be employed in. Each light shutter element makes an output B, and the sensor 72 which is moving forward in the main scanning direction X outputs a waveform indicating the output B. Values detected by the sensor 72 during an on-period is integrated, and after the on-period, the integrated value is sampled/held and subjected to A/D conversion.

In the measurement, since the slit 73a which has a width substantially equal to the width of each light shutter element is moved in the main scanning direction X at such a speed as to carry out a plurality of samplings from each light shutter element, the output after the A/D conversion is as shown in FIG. 14. When the sensor 72 comes to a position exactly opposite a driven light shutter element 31, the sensor 72 detects the maximum quantity of light, and when the sensor 72 comes to a position between adjacent driven light shutter elements 31, the sensor 72 detects the minimum quantity of light. Accordingly, from the position of a peak of the output waveform of the sensor 72, the address of a driven light shutter element can be recognized. The minimum quantity of light detected between the driven light shutter elements 31 depends on the MTF of the imaging lens, the width of the slit 73a, etc. Although the position of an undriven light shutter element can be recognized from the position of a through of the output waveform of the sensor 72, it is possible to take an exact midpoint between adjacent peaks as the address of an undriven light shutter element.

Next, while the driving signal A is applied to light shutter elements which are in even numbers in the light shutter array, the sensor 72 is moved backward to detect the quantities of light outputted from the light shutter elements. By superimposing the results with respect to the light shutter elements which are in even numbers on the results with respect to the light shutter elements which are in odd numbers, the output light-quantity characteristics of all the light shutter elements can be recognized.

In the above-described measurement, since the positions of the light shutter elements are found out based on the output of the sensor 72, it is not necessary to monitor the position of the sensor 72 by use of an encoder and a detector for the initial position of the sensor 72. In this embodiment, the driving signal A is to drive each light shutter element to come to an on-state and an off-state alternately, and the sensor 72 detects the quantities of light both in periods of the on-state and in periods of the off-state.

The quantity of light in an off-period (the quantity of leakage light which means the quantity of light leaking from the halogen lamp 21) is measured in the same manner as that in an on-period. Specifically, values detected by the sensor 72 during the off-period is integrated, and after the off-period, the integrated value is sampled/held and subjected to A/D conversion. It is possible to find out the address of a light shutter element based on the outputs of the sensor 72 during the off-periods. However, because the outputs of the sensor 72 during the off-periods are small, the address of a light shutter element is determined from the position of the maximum output of the sensor 72 during the on-periods of the light shutter element, and an output during an off-period adjacent to the on-period when the sensor 72 outputs the maximum value is taken as the quantity of light in its off-state. It is preferred to determine the minimum quantity of light during the on-periods by using the following expression:

quantity of light outputted from a light shutter element= maximum quantity of light measured from the element+(quantity of entering light−quantity of leakage light)×correction coefficient In the above expression, the quantity of entering light means the quantity of light leaking from adjacent elements.

The correction coefficient, which depends on the driving pattern of the light shutter elements and the width of the slit 73a, is within a range from 0.2 to 1.0. When line/dot images (sharp images) are to be formed, it is sufficient to carry out a light-quantity correction to each light shutter element only in accordance with the maximum quantity of light measured from the element. Further, in a case of reproducing one dot (a pixel), the light-quantity correction only in accordance with the maximum quantity of light is preferred.

Although a pattern of driving every other light shutter element is adopted in the above-described measuring method, various driving patterns are possible.

Figure 15:
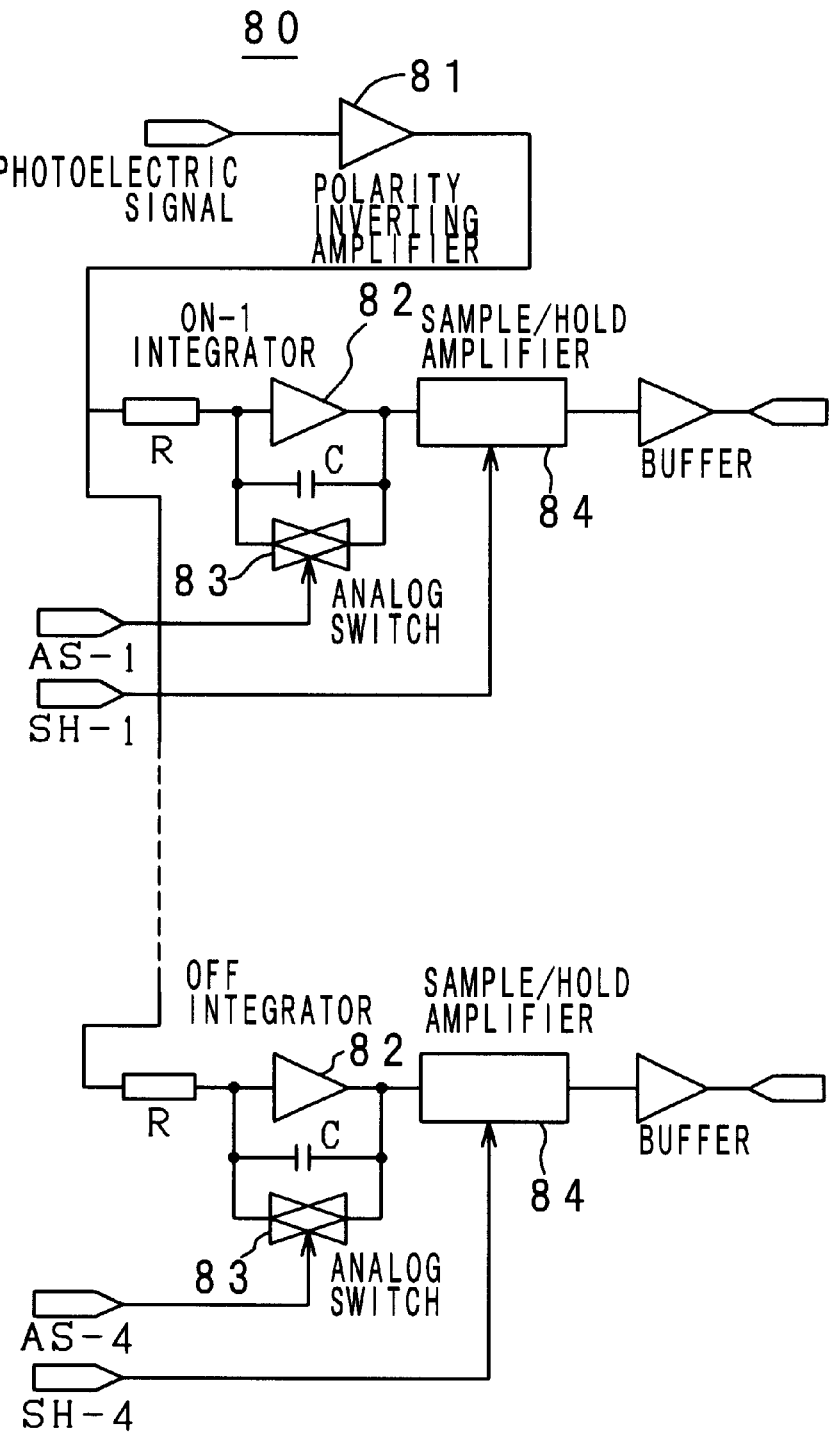
FIG. 15 is a block diagram of an integrating circuit for the light-quantity measurement.
Figure 16:
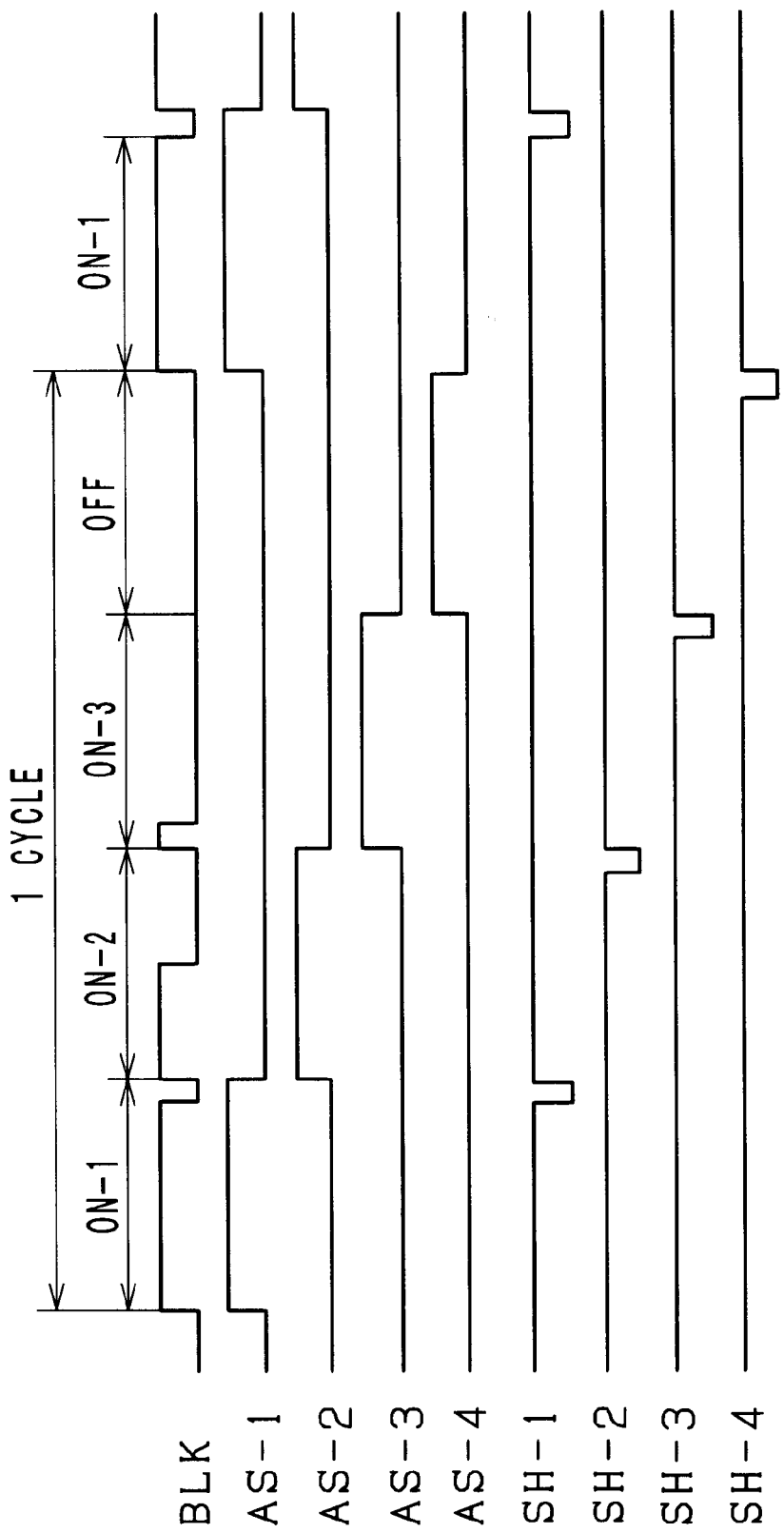
FIG. 16 is a timing chart showing the operation of the integrating circuit.

FIG. 15 shows an integrating circuit 80, and FIG. 16 shows a timing chart.

The integrating circuit 80 is to measure the quantities of light outputted from each light shutter element at different four levels, at a high duty, at a middle duty, at a low duty and at an off level, and the integrating circuit 80 is composed of four lines although FIG. 15 shows only two of the four. A photoelectric signal outputted from the sensor 72 is inputted to an integrator 82 in one of the four lines via a polarity inverting amplifier 81. Further, the signal is sent to a sample/hold amplifier 84 and is subjected to A/D conversion. The photoelectric signal is subjected to integration in the integrator 82 while an analog switch connected thereto is kept on in response to the corresponding one of signals AS-1 through AS-4. The integrated value is held in the sample/hold amplifier 84 when the corresponding one of signals SH-1 through SH-4 drops and is converted into a digital signal by an A/D converter (not shown).

With this integrating circuit 80, the quantities of light outputted from each light shutter element at four levels can be measured during one scan. From these measured values, approximate expressions to indicate the light quantity characteristics of the light shutter elements are calculated, and a light quantity correction table is made based on the expressions. Thus, a suitable light-quantity correction can be made to each light shutter element for formation of a quality multi-tone image.

Structure and Operation of the Driver ICs

Now, the driver ICs which drive the optical write head 20 and its operation for the light-quantity measurement by use of the light quantity measuring device 70 are described.

The thin-out driving of the light shutter elements for the light-quantity measurement can be realized by transmitting necessary data from the CPU to drive the optical write head 20. However, this function can be imparted to the driver ICs.

Figure 17:
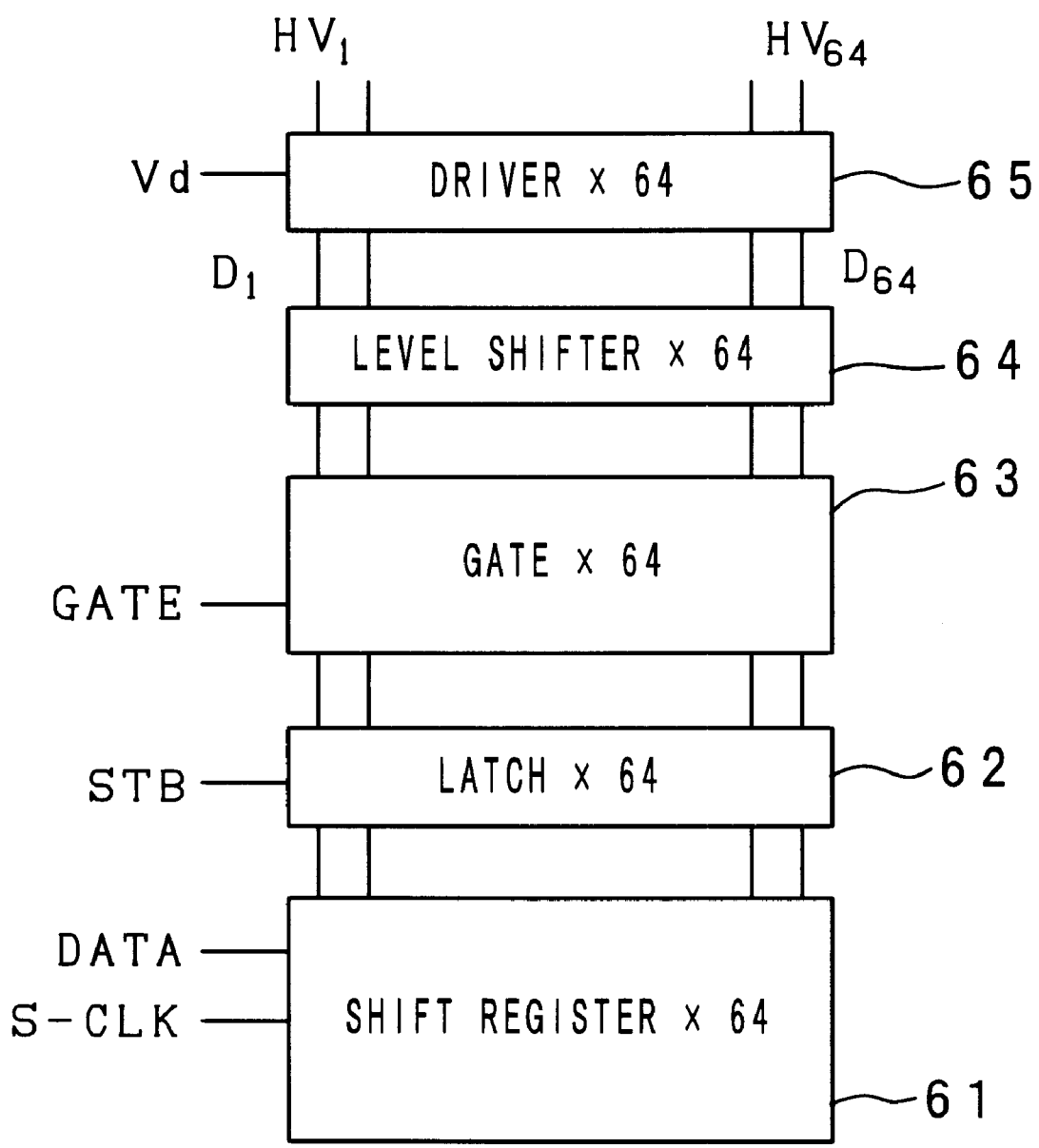
FIG. 17 is a block diagram of a driver IC for two-value image formation.

FIG. 17 shows the structure of a driver IC 60 which is a type for formation of two-value images. For practical use, a plurality of driver ICs 60 are connected to each other by a ladder chain to drive 1024 shutter elements. Each driver IC 60 is to drive 64 light shutter elements, and comprises a shift register 61, a latch circuit 62, a gate circuit 63, a level shift circuit 64 and a driver circuit 65.

Image data DATA(A) and DATA(B) are shifted into the shift register 61 based on a shift signal R/L in synchronization with a shift clock signal S-CLK and are latched in the latch circuit 62 controlled by a strobe signal STB. When a gate signal GATE is inputted to the gate circuit 63, signals $D_1$ through $D_{64}$ are sent to the driver circuit 65 via the level shift circuit 64. A driving voltage Vd is applied to the driver circuit 65, and the driver circuit 65 outputs $HV_1$ through $HV_{64}$ to the shutter elements. The pulse widths of $HV_1$ through $HV_{64}$ are set in accordance with the signals $D_1$ through $D_{64}$ sent from the level shift circuit 64.

In the driver IC 60, when the light-quantity measurement is commanded, a data signal DATA is sent to the shift register 61 in synchronization with the shift clock signal S-CLK and is latched in the latch circuit 62 controlled by the strobe signal STB. Then, by driving the gate signal GATE at a specified duty, the light shutter elements can be driven to output a specified quantity of light. The thin-out driving of the light shutter elements can be realized by dividing the shift clock signal S-CLK and by outputting the image data DATA associated with the divided shift clock signal by use of an AND gate. If the shift clock signal S-CLK is divided into two (the frequency is made a half), every other light shutter element can be driven. A repetitive signal is used for the thin-out driving, and by using a plurality of gate signals GATE with different duties, the above-described light-quantity measurement can be carried out without a printer controller. If the light shutter elements are arranged in two lines staggeringly, that is, in a line of odd numbers and a line of even numbers, at least a volume of image data DATA covering the light shutter elements in one line are set at "H" level, sent to the shift register 61 and latched in synchronization with the strobe signal STB. Thereafter, the above-described control is carried out. In this way, the drive of every other light shutter element can be realized more easily. Also, by providing a test input terminal to the gate circuit 63 to turn on the gate circuit forcibly and by sending a duty signal to the terminal, the light-quantity measurement can be carried out easily.

Figure 18:
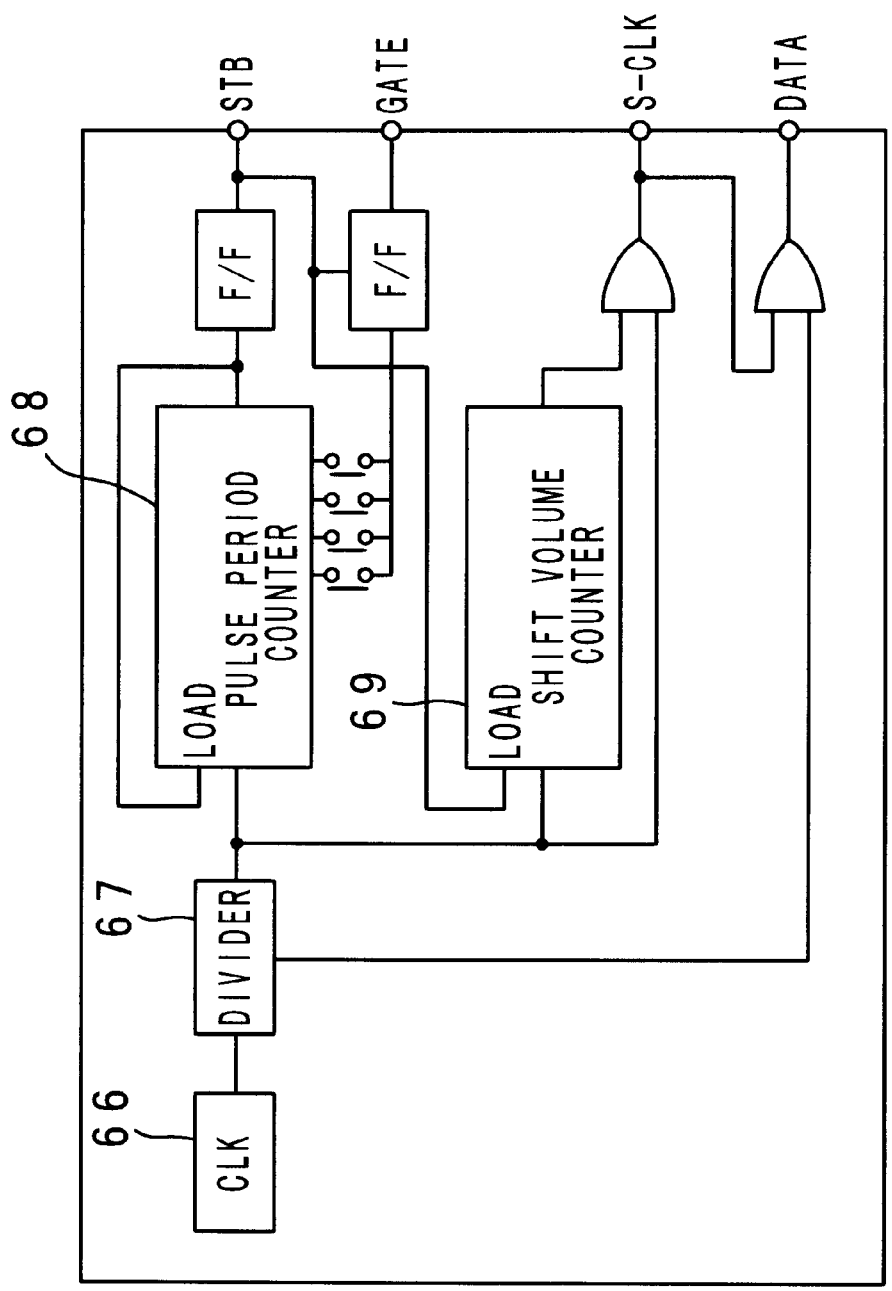
FIG. 18 is a block diagram of a circuit for producing signals transmitted to the driver IC of FIG. 17.
Figure 19:
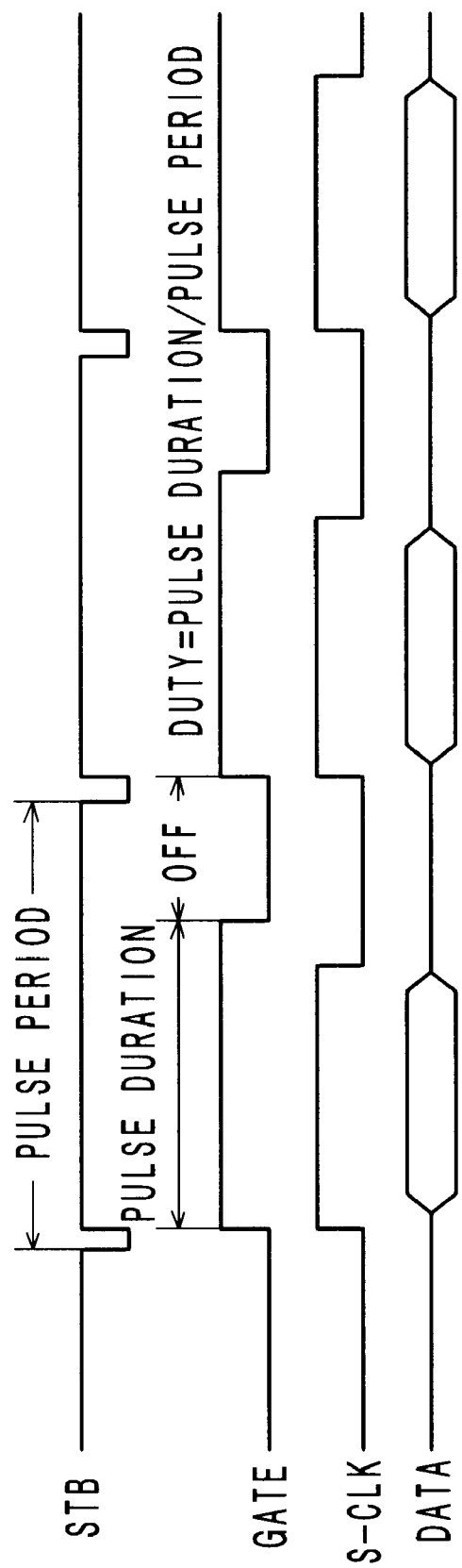
FIG. 19 is a timing chart showing the operation of the signal producing circuit of FIG. 18.

The operation of the driver ICs 60 for the light-quantity measurement is described in more detail referring to FIGS. 18 and 19. A basal clock signal CLK is divided by a divider 67 into a shift clock signal S-CLK and a counter signal. A pulse period counter 68 is to determine a pulse period and produces the strobe signal STB. When the counter 68 counts up a specified time, a one-shot multi-vibrator is driven to output the strobe signal STB, and at the same time, the counter 68 is reset. Thereby, the strobe signal STB is outputted periodically. By making the time to be counted by the counter 68 variable, the duty becomes variable. A shift volume counter 69 is to determine the volume of data to be transmitted to the shift register 61. While the counter 69 is counting, the counter 69 makes an output. The output from the counter 69 and the clock signal CLK are inputted to an and gate, and then, the shift clock signal S-CLK is outputted.

The data signal DATA can be made from the clock signal CLK into various patterns. A signal for a drive of every other light shutter element can be produced by using a signal into which the clock signal CLK is divided to have a half frequency. Other patterns can be made by use of a simple logic circuit. In the structure wherein light shutter elements are arranged in two lines staggeringly, in a line of odd numbers and in a line of even numbers, the shift volume counter 69 is not necessary, and the circuit is simpler. In this case, the data signal DATA is kept at the level of "H" at all times so that the shift clock signal S-CLK is outputted continuously.

Color Printer

Figure 20:
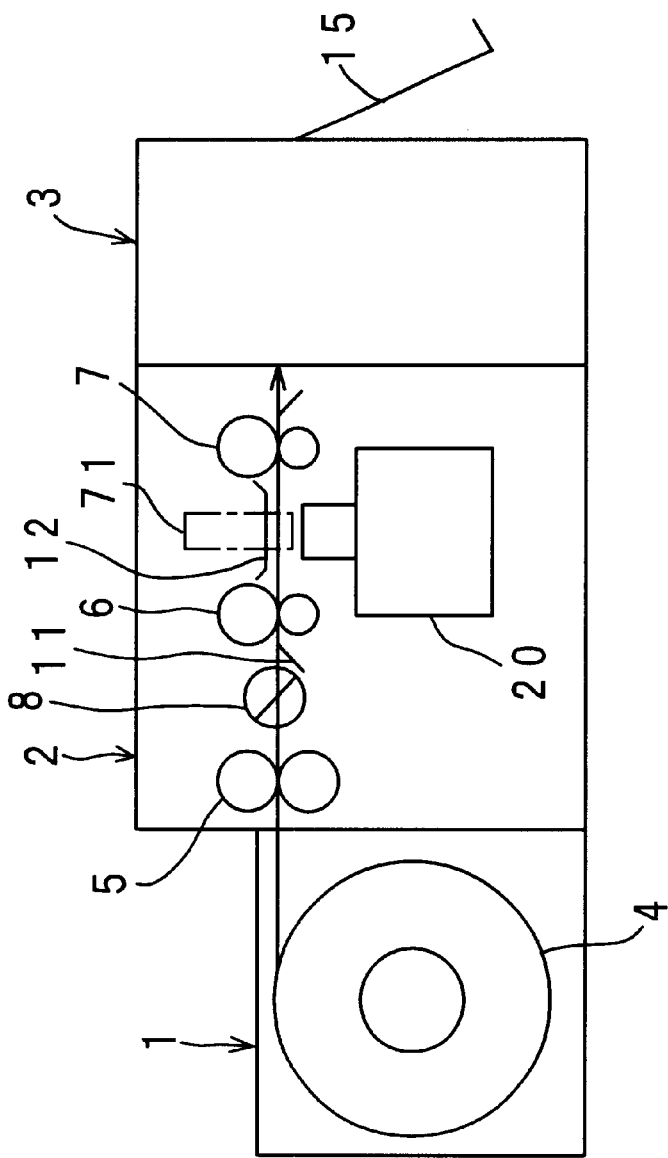
FIG. 20 is a schematic view of a color printer provided with the optical write head.

FIG. 20 is a schematic view of a color photoprinter. The color printer comprises a print sheet containing station 1, an image forming station 2 and a processing station 3. A print sheet 4 is contained in the station 1 in the form of a roll. In the image forming station 2, the optical write head 20 shown by FIG. 1 and the measuring unit 71 shown in FIG. 12 (the microscope 77 and the CCD camera 78 are omitted) are provided. Further, in the station 2, pairs of transport rollers 5, 6 and 7, a cutter 8 and transport guide plates 11 and 12 which are used for handling of the print sheet 4 are provided.

The print sheet 4 is guided into the image forming station 2 through the transport rollers 5 with its photosensitive side facing down. When a specified length comes into the station 2, the rollers 5 are stopped, and the cutter 8 is driven to cut the print sheet 4. The cut piece of print sheet 4 is transported by the rollers 6 and 7 at a constant velocity. When the print sheet 4 passes over the optical write head 4, it is exposed to light coming through an opening made in the guide plate 11, whereby a latent image is formed on the print sheet 4. After the exposure, the print sheet 4 is subjected to development, fixation and drying in the processing station 3, and then, the print sheet 4 is discharged onto a tray 15.

The print sheet 4 is transported to the exposure position in such a way that writing of the optical write head 20 can start at a writing start point of the print sheet 4, and during the writing, the print sheet 4 is transported at a constant velocity. However, transportation of the print sheet 4 at the exposure position does not have to be continuous but may be intermittent at a pitch corresponding to the density in the sub scanning direction.

If the print sheet 4 is cut while the print sheet 4 is passing the exposure position, the coincidence between the start of writing of the optical write head 20 and the writing start point of the print sheet 4 may be damaged. In order to avoid this trouble, the print sheet 4 is cut while the sheet 4 is bent, or the exposure is started after a cut of the print sheet 4 although this necessitates a long print sheet transport path. When a roll of print sheet is used in the structure wherein a cut of the print sheet is carried out before exposure, in order to prevent the print sheet from being exposed unnecessarily, the lamp 21 of the optical write head 20 is turned off, the output of the lamp 21 is reduced to such an extent as not to cause exposure of the print sheet, or the optical write head 20 is shut mechanically by use of a shutter.

As shown in FIG. 21, the measuring unit 71 is located opposite the optical write head 20 and is capable of reciprocate in the main scanning direction X with forward/backward rotation of the driving guide shaft 76*a*. The measuring unit 71 is controlled by a control section 91 and a sequencer 92. Prior to exposure of the print sheet 4, the measuring unit 71 measures the quantity of light outputted from each light shutter element of the optical write head 20 in the above-described manner. Then, the measuring unit 71 retreats from the print sheet transport path so as not to interfere the transportation of the print sheet 4 (see the alternate short and long dash line in FIG. 21). The measuring unit 71 is in the retreating position at all times other than the time of the light-quantity measurement.

Figure 22A:
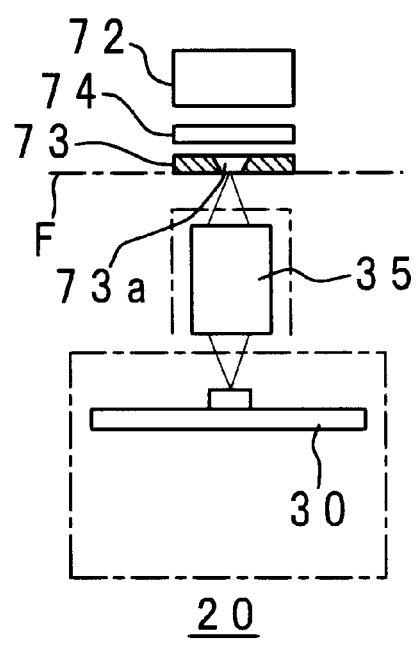
FIGS. 22a and 22b are illustrations showing the positional relationship between the optical write head and the light-quantity measuring unit.

The guide plate 11 is so located that its guide surface 11' is on the focal surface F (see FIG. 22a) of the optical write head 20, and a focal shift never occurs even when a print sheet with a different thickness is used. The pairs of transport rollers 6 and 7 are controlled by a pulse motor to rotate at a constant velocity, and thereby, the sub scanning speed is kept constant. An upper guide surface 12 is provided to prevent a float of the print sheet and is pressed onto the print sheet by its own weight or by a spring or the like.

The slit plate 73 of the measuring unit 71 is on the focal surface F of the optical write head 20, but as mentioned, the measuring unit 71 retreats from the print sheet transport path at all times other than the time of the light-quantity measurement.

During the light-quantity measurement, light emergent from the optical write head 20 is incident to the sensor 72 through openings made in the guide plates 11 and 12. If the whole body or the light passing portion of the guide plate 11 is made of a light transmitting material such as an acrylic material, the opening is not necessary. If the guide plates 11 and 12 have no openings, the guiding functions of the guide plates 11 and 12 are improved. With respect to the upper guide plate 12, it can be structured to retreat from the guiding position in the time of the light-quantity measurement, and in this case, the opening is not necessary.

Figure 22B:
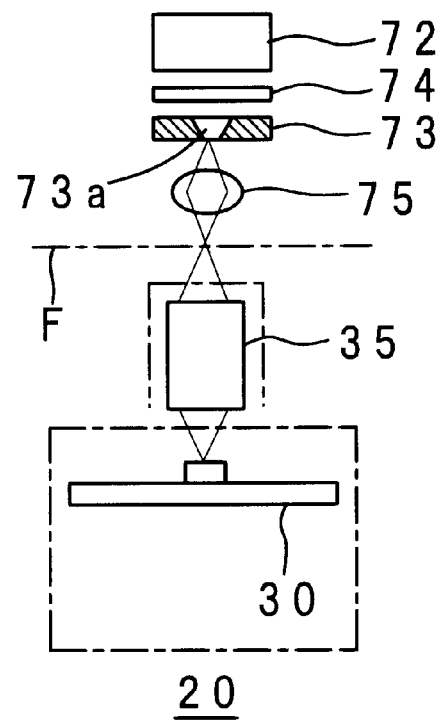

As shown in FIG. 22b, it is possible to provide a lens 75 between the imaging lens array 35 and the slit plate 73. With the lens 75, the measuring unit 71 can be located apart from the focal surface F, and it becomes no longer necessary to make the measuring unit 71 retreat from the print sheet transport path in the time of exposure, thereby reducing the size of the apparatus. In this case, the upper guide plate 12 must be made of a light transmitting material.

In this color printer, the RGB filter 25 of the optical write head 20 is rotated to switch the color of the light at a high speed, and line by line, images of R, B and G are written while the light shutter elements are turned on and off. This printer is usually powered on by a timer to carry out temperature control of the developer, etc. In this warm-up operation, the light-quantity measurement and the light-quantity correction (calibration) are carried out. The calibration, as described above, is a process to make correction to the light shutter elements of the optical write head 20 in quantity of light in accordance with the results of measurement under conditions of substantially the same as actual exposure, and thereby, quality images can be obtained.

In a case of a full-color printer, first, only light shutter elements which are on odd numbers in the light shutter array are driven at a specified frequency (depending on the image density in the sub scanning direction) to output a specified quantity of light (duty or intensity), and the color of the light is switched in synchronization with the drive. Meanwhile, the measuring unit 71 is moved forward to measure the quantities of light outputted from the light shutter elements at times of emitting RGB colors at different duties. The measuring unit 71, while moving backward, measures the quantities of light outputted from light shutter elements which are on even numbers at times of emitting RGB colors at different duties in the same manner.

In order to make an accurate light-quantity correction to each light shutter element, it is effective to measure the quantities of light at four levels including the quantity of light in an off-state (quantity of leakage light). During the measurement, the color switching speed is reduced to one fourth of the speed for actual image formation, and with respect to each color, the quantities of light at four levels are measured. Twelve kinds of quantities of light (RGB×4) outputted from each light shutter element are measured during one scan. Integrated values of photoelectric outputs of the sensor 72 are sampled/held and subjected to A/D conversion, and in the control section, an approximate output light-quantity characteristic curve is made based on the values at the four levels. Then, the light-quantity correction is carried out referring to the curve. The light quantity correction is carried out based on the light shutter element which has a minimum measured value. Data for the correction are stored in a memory for a look-up table (for example, a flash ROM).

Further, the color switching speed during the measurement may be equal to that for actual image formation. In this case, for measurement of the quantities of light at a plurality of levels with respect to each color, the driving frequency is heightened. Furthermore, if both the color switching speed and the driving frequency during the measurement are equal to those for actual image formation, the quantities of light at a plurality of levels are measured during a plurality of scans.

FIG. 23 shows the structure of the control section. Values detected by the sensor 72 are amplified by an amplifier 121 and integrated by the integrating circuit 80 (see FIG. 15). Integrated values calculated in the circuit 80 are inputted to a CPU 124 via a four-channel multiplexer 122 and an A/D converter 123, and in the CPU 124, correction data are produced.

Image data read by a film scanner are unfolded on a bit map memory of the image memory. Corrections are made to the data on the bit map memory referring to the look-up table which is stored with light-quantity correction data, and the corrected image data are transmitted to the driver of the light shutter module 30. Thus, an image with a density equal to that of the original image can be reproduced while the light color is switched at a specified speed.

Figure 24:
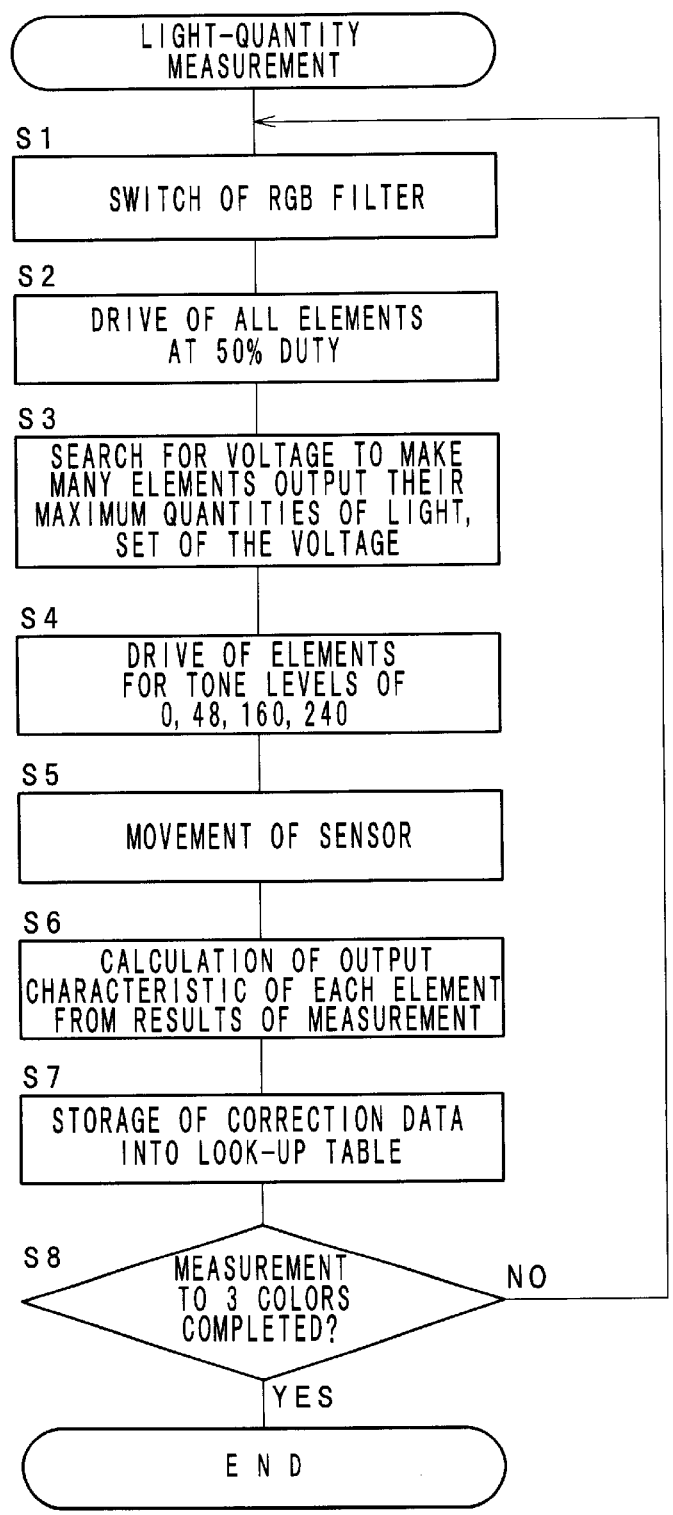
FIG. 24 is a flowchart which shows a control procedure of the control section for the light-quantity measurement.

Next, referring to FIG. 24, the control procedure of the light-quantity measurement is described.

The control routine for the light-quantity measurement is carried out in response to a turn-on of the printer. First, at step S1, the RGB filter is switched to transmit a specified color. At step S2, all the light shutter elements are driven simultaneously at a duty of 50%. At step S3, a voltage which maximizes the outputs of many of the light shutter elements is searched, and the voltage is set as the driving voltage. While the light shutter elements are driven to output quantities of light for reproduction of four tone levels of 0, 48, 160 and 240 repeatedly at step S4, the sensor 72 is moved at step S5 to measure the quantities of light outputted from the light shutter elements. Next, at step S6, the output characteristic of each of the elements is calculated from the measured values, and correction data are produced. At step S7, the correction data are stored in the look-up table 97. Then, at step S8, it is checked whether the measurement has been completed with respect to three colors, and if not, the program returns to step S1.

In this embodiment, during one reciprocate scan, all the light shutter elements are subjected to the light-quantity measurement. However, it is possible to divide the measurement according to levels and colors. In this case, the number of scans for the measurement is increased, thereby consuming time, but it has an advantage that the integrating circuit can be simplified.

The number of levels of the quantity of light to be measured depends on the output characteristics of the light shutter elements. If the light shutter elements have output characteristics of good linearity, measurement of the quantities of light at two levels is practical. Further, if the quantity of leakage light is zero, the quantity of light at one level is practical. However, the outputs of light shutter elements generally do not have ideal linearity, and measurement of the quantities of light at four levels is practical to any element. With respect to the light colors, if the light shutter elements have the same output characteristic in outputting light of any of the colors, measurement with respect to only one color is enough for correction. Also, if there is such small differences in output characteristic among the light colors as to be allowable, only measurement with respect to green or white is sufficient.

Light shutter elements made of PLZT change their light transmitting characteristics according to the driving voltage applied thereto. Therefore, preferably, during the measurement, a driving voltage with the same waveform as that of the driving voltage for actual image formation is applied to the light shutter elements. A specific way is to apply a voltage which is optimal for blue exposure to the light shutter elements for the light-quantity measurement with respect to blue and the other colors (red and green). Another way is to apply voltages which are optimal for exposures of the colors to the light shutter elements for the measurement with respect to the respective colors. In the first embodiment, the driving voltage must be changed at a high speed, thereby causing rounding of the waveform of the driving voltage. Therefore, in the first embodiment, it is preferred that identical power sources or a single power source are/is used for the measurement and for actual image formation.

In the above-described light-quantity measuring method, as described referring to FIG. 14, the address of each light shutter element is determined based on the output of the sensor 72 without using any special devices for determination on the address. Therefore, when the measuring device 70 is used to test an optical write head, by counting the number of samplings between peaks of the output waveform, trouble (pitch error, errors in alignment of the light shutter elements, etc.) of the optical write head can be detected. Also, when the measuring unit 71 is employed in a printer provided with an optical write head, by counting the number of samplings between peaks, abnormal movement of the measuring unit 71 can be detected. In case of abnormal movement of the measuring unit 71, the abnormality is displayed and warned, and the printer is stopped. Further, when the measuring unit 71 is employed in a printer, light-quantity correction which copes with aging of the light shutter elements becomes possible.

Figure 25:
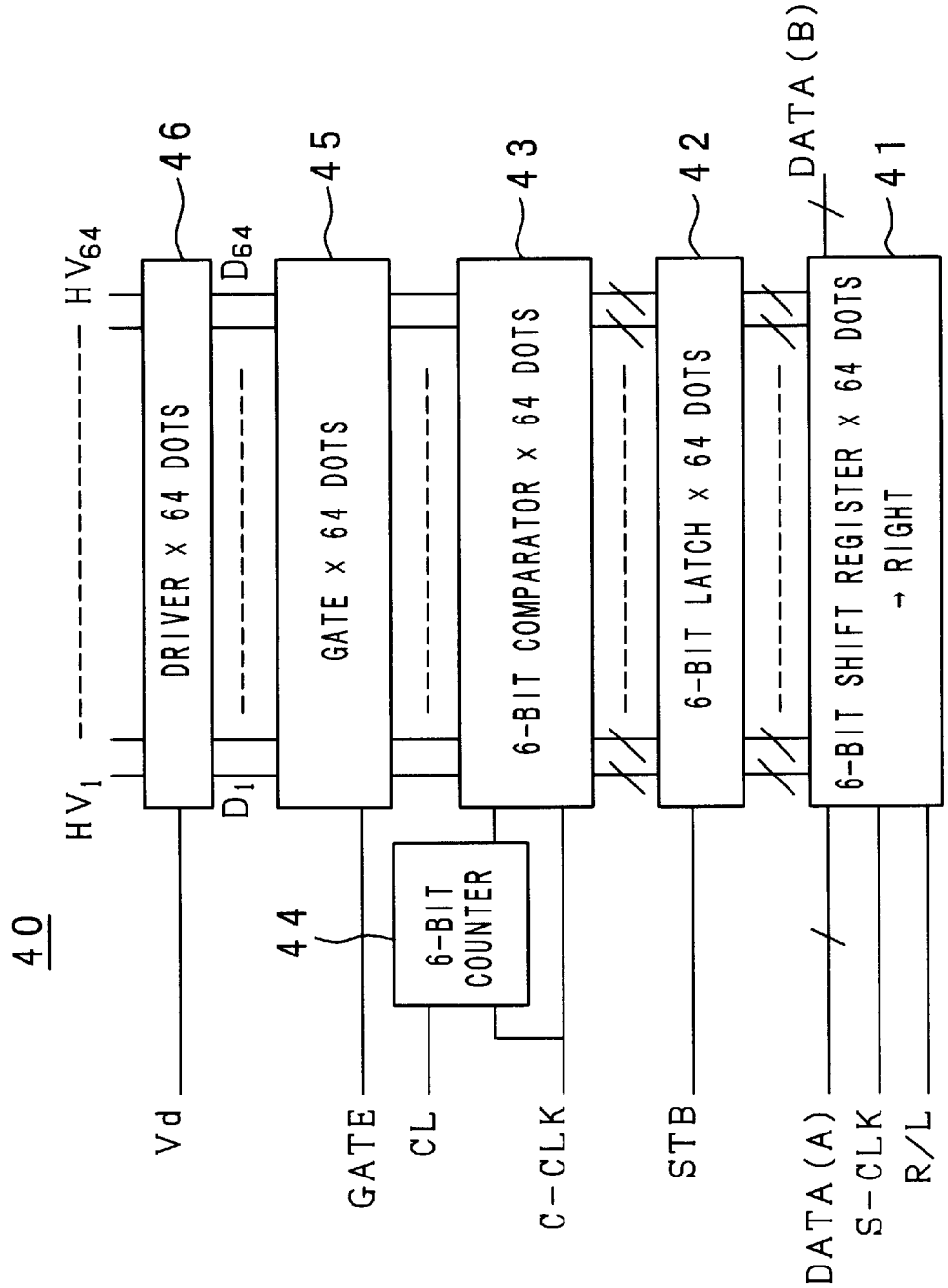
FIG. 25 is a block diagram of a driver IC for multi-tone image formation.
Figure 26:
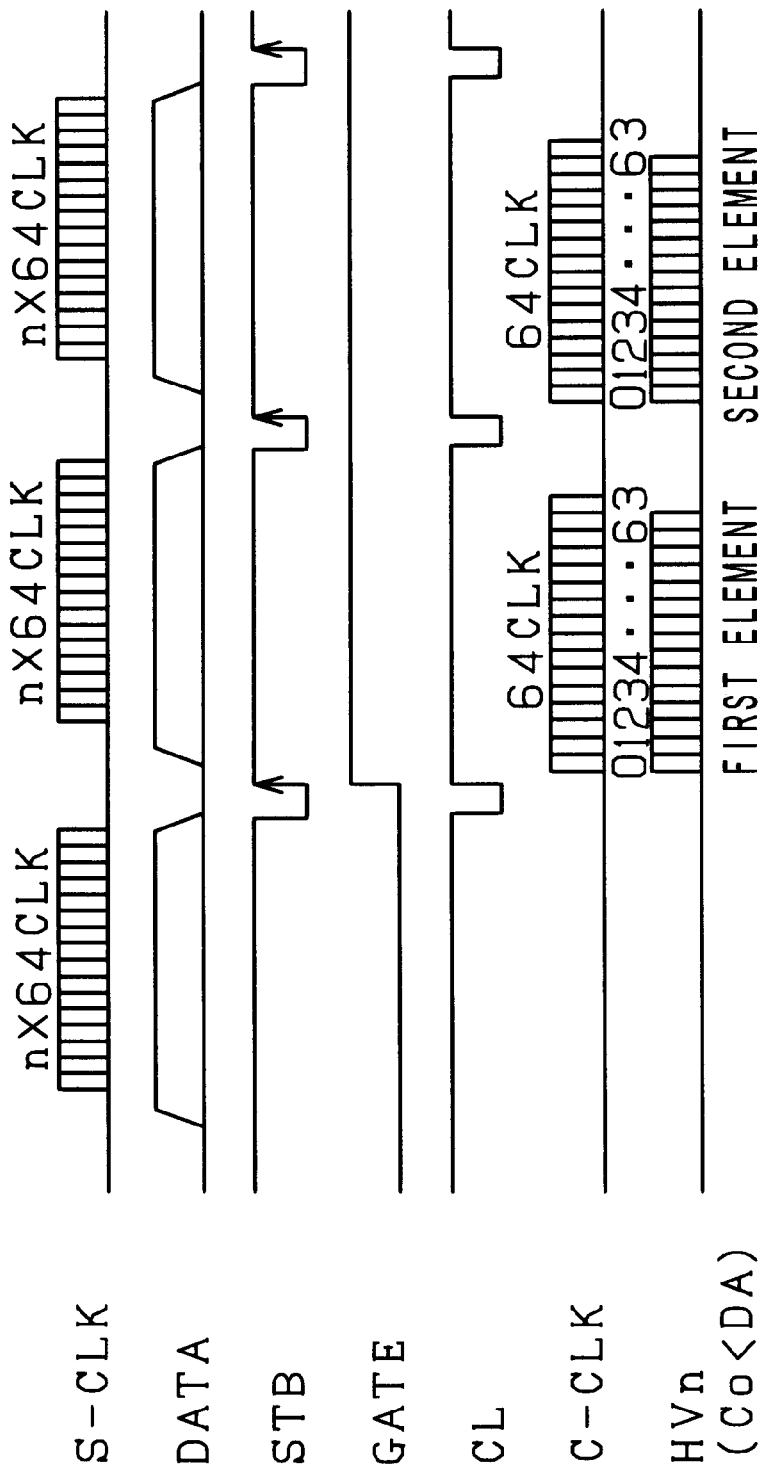
FIG. 26 is a timing chart showing the operation of the driver IC of FIG. 25.

Further, it is possible to carry out the light-quantity measurement and the light-quantity correction at any time as well as the time of warm-up operation of a printer. Structure and Operation of the Driver ICs FIGS. 25 and 26 show the structure of a driver IC 40 for multi-tone image formation and the timing chart of its operation. For practical use, a plurality of driver ICs 40 are connected to each other by a ladder chain to drive 1024 shutter elements. Each driver IC 40 is to drive 64 light shutter elements, and comprises a six-bit shift register 41, a six-bit latch circuit 42, a six-bit comparator 43, a six-bit counter 44, a gate circuit 45 and a driver circuit 46.

Image data DATA(A) and DATA(B) are shifted into the shift register 41 based on a shift signal R/L in synchronization with a shift clock signal S-CLK and are latched in the latch circuit 42 controlled by a strobe signal STB. Thereby, the tone level of each pixel is set. The counter 44 counts the clock signal C-CLK, and the comparator 43 compares the counter value with the latched value. When the both values become equal, the gate circuits 45 stops the output. The counter 44 is cleared on receiving a clear signal CL.

A driving voltage Vd is applied to the driver circuit 46, and the driver circuit 46 outputs $HV_1$ through $HV_{64}$ to the shutter elements. The pulse widths of $HV_1$ through $HV_{64}$ are set in accordance with signals $D_1$ through $D_{64}$ sent from the gate circuit 45. Thus, each light shutter element is turned on for a time (pulse width) in accordance with image data DATA for the corresponding pixel.

Control for the light-quantity measurement toward an optical write head with the multi-tone driver ICs 40 is basically similar to the control of the two-value driver ICs 60. A specified quantity of light to be outputted from each light shutter element is commanded by a data signal DATA by use of a dip switch or the like. The data signal DATA is sent to the shift register 41 and latched controlled by the strobe signal STB, and a duty in accordance with the data signal DATA is produced in the comparator 43. Then, specified light shutter elements are driven to output the specified quantity of light controlled by a gate signal GATE. Such signals for thin-out driving are repetitious signals and are produced in a comparatively simple circuit.

In the structure wherein the light shutter elements are arranged in two lines staggeringly, that is, in a line of odd numbers and in a line of even numbers, the thin-out driving can be carried out by setting the data signal DATA to be sent to one of the lines at "H" level, which is simpler control. In order to vary the quantity of light to be outputted from each light shutter element, the setting of the dip switch is changed.

Spectral Sensitivity Characteristic

Figure 27:
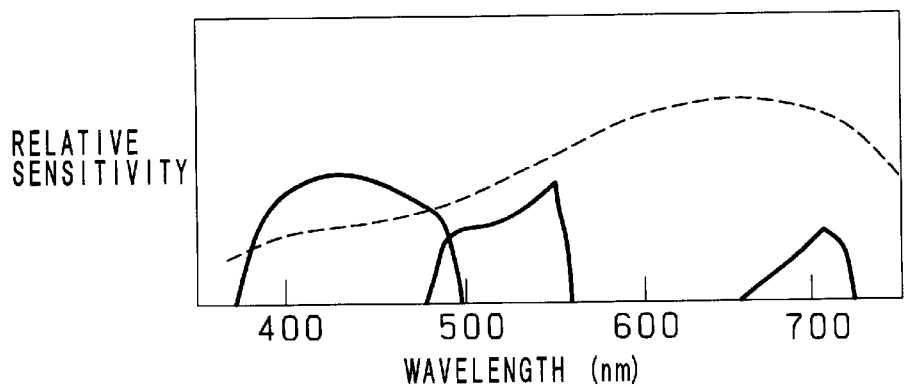
FIG. 27 is a graph which shows the spectral sensitivity of a print sheet and that of a sensor.

The spectral sensitivity characteristic of the sensor 72 is different from that of the print sheet 4. In FIG. 27, the dotted line shows the spectral sensitivity characteristic of a photomultiplier used as the sensor 72, and the solid line shows the spectral sensitivity characteristic of the print sheet 4. In this embodiment, adjusting means which will be described later is provided to make up the difference between the sensor 72 and the print sheet 4 in spectral sensitivity characteristic so that correction data produced based on the results of the measurement by use of the sensor 72 can match exposure of the print sheet 4. In the following, first to fifth examples of the adjusting means are described.

Figure 28:
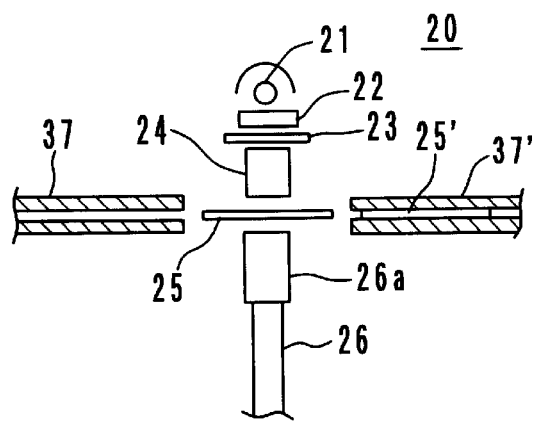
FIG. 28 is an illustration of a first example of making up the difference in spectral sensitivity between the print sheet and the sensor.

In the first example, the color correction filter 23 and the RGB filter 25 of the optical write head 20 have color balance which matches the spectral sensitivity of the print sheet 4, and the optical write head 20 carries out exposure of the print sheet 4 using these filters 23 and 25. As shown in FIG. 28, the RGB filter 25 is attachable into and detachable from a guide rail 37, and another RGB filter 25' is attachable into and detachable from the guide rail 37. With this arrangement, the RGB filter 25 and 25' are capable of advancing into and retreating from the optical path in exchange for each other. The RGB filter 25' has color balance which matches the spectral sensitivity of the sensor 72. At the time of light-quantity measurement, the RGB filter 25' advances into the optical path from the guide rail 37' to switch the light color, and simultaneously, the filter 25 retreats from the optical path to the guide rail 37.

Figure 29:
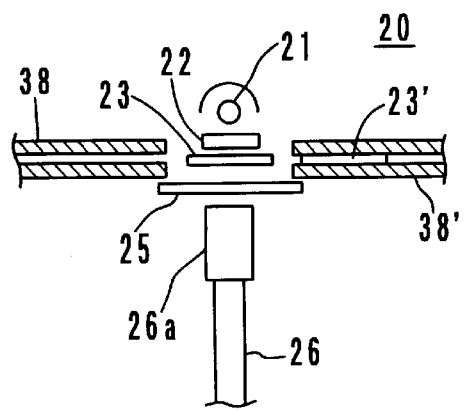
FIG. 29 is an illustration of a second example of making up the difference in spectral sensitivity between the print sheet and the sensor.

In the second example, the color correction filter 23 and the RGB filter 25 have color balance which matches the spectral sensitivity characteristic of the print sheet 4 as in the first example. Further, as shown in FIG. 29, another color correction filter 23' is provided, and the filter 23' is capable of advancing into the optical path in exchange for the color correction filter 23. The color correction filters 23 and 23' are attachable into and detachable from guide rails 38 and 38' respectively. The color correction filter 23' has color balance which matches the spectral sensitivity of the sensor 72. At the time of light-quantity measurement, the filter 23' advances into the optical path from the guide rail 38', and the filter 23 retreats from the optical path to the guide rail 38.

Further, it is possible to provide two color correction filters 23 and 23' and two RGB filters 25 and 25' in the optical write head 20. In this case, the optical write head 20 is so structured that the filters 23 and 25 can advance into the optical path at the time of exposure of the print sheet 4 and that the filters 23' and 25' can advance into the optical path at the time of light-quantity measurement. Also, the optical write head 20 can be so structured that a single color correction filter 23 and a single RGB filter 25 are provided therein and that the color correction filter 23 advances into the optical path at the time of light-quantity measurement and retreats from the optical path at the time of exposure of the print sheet 4.

Figure 30:
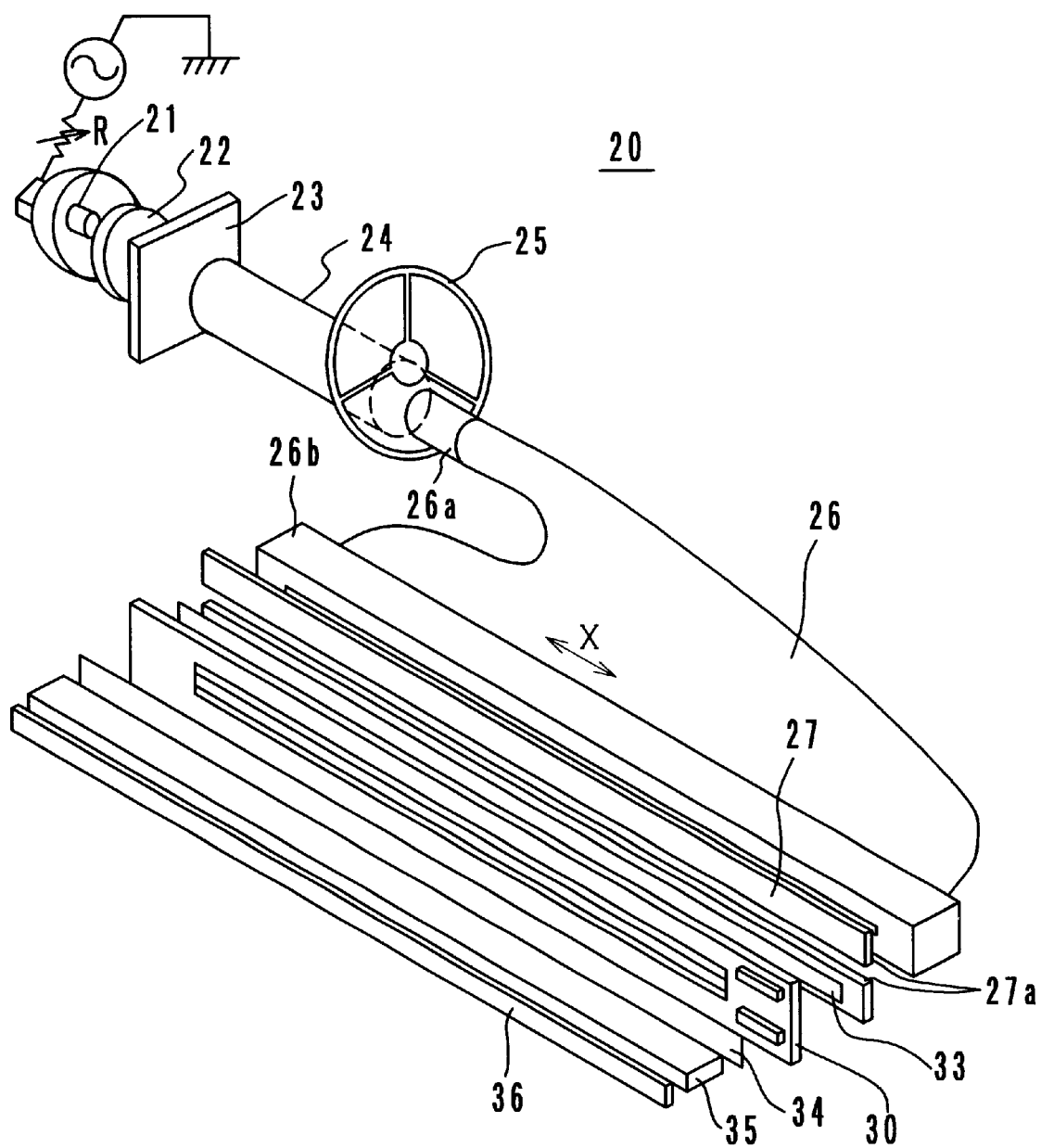
FIG. 30 is a perspective view of the optical write head when a third example of making up the difference in spectral sensitivity between the print sheet and the sensor is adopted therein.
Figure 31:
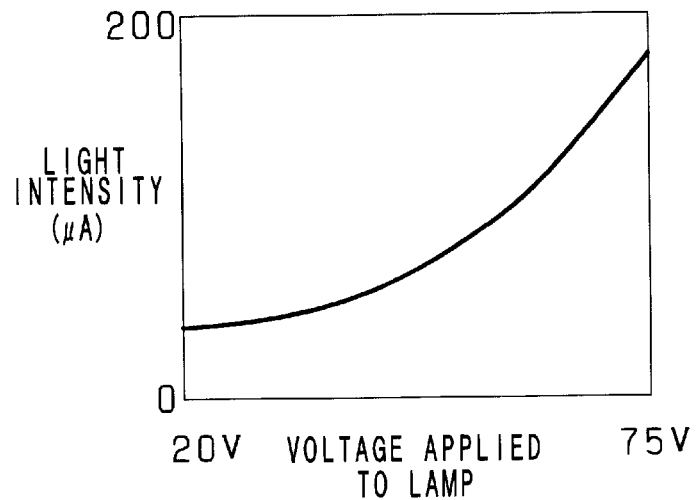
FIG. 31 is a graph which shows the relationship between the voltage applied to the lamp and the intensity of light emitted from the lamp in the optical write head in which the third example is adopted.

In the third example, the difference between the sensor 72 and the print sheet 4 in spectral sensitivity characteristic is made up by making a difference in quantity of light emitted from the halogen lamp 21 between that for light-quantity measurement and that for exposure of the print sheet 4. The difference in quantity of light is made by changing the voltage applied to the halogen lamp 21. The voltage is changed by switching the resistance of the register R as shown in FIG. 30. FIG. 31 shows the relationship between the intensity of light emitted from the halogen lamp 21 and the voltage applied to the halogen lamp 21. In Table 1, the voltages which have realized optimal color balance are shown.

TABLE 1

| | Lamp Voltage (Rating 82 V/300 V) | |
| --- | --- | --- |
| | Exposure | Measurement |
| Red | 46 V | 45 V |
| Green | 29 V | 52 V |
| Blue | 27 V | 70 V |

Figure 32A:
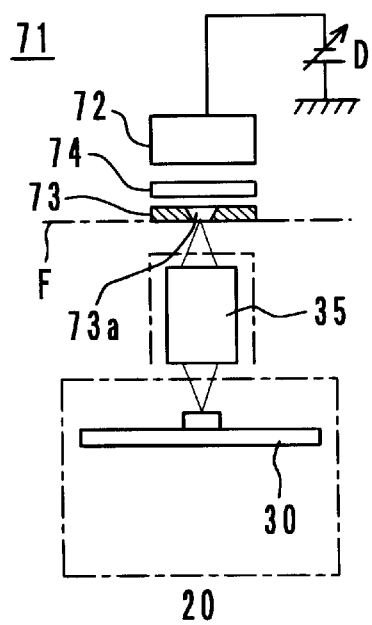
FIGS. 32a and 32b are illustrations which show the positional relationship between the optical write head and the light-quantity measuring device when a fourth example of making up the difference in spectral sensitivity between the print sheet and the sensor is adopted in the optical write head.
Figure 32B:
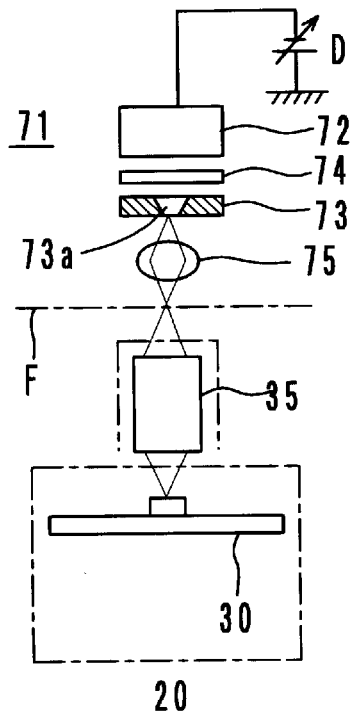

In the fourth example, the color balance of the whole system of the optical write head 20 is set for exposure of the print sheet 4, that is, to match the spectral sensitivity of the print sheet 4, and at the time of light-quantity measurement, the photosensitivity of the sensor 72 is switched to match the spectral sensitivity of the print sheet 4. A photomultiplier is used as the sensor 72, and as shown in FIGS. 32a and 32b, the accelerating voltage applied to the phoptomultiplier is changed by switching the voltage applied to a power source D. Thereby, the color balance is controlled.

At the time of light-quantity measurement, suitable color balance can be realized, for example, by switching the accelerating voltage applied to the photomultiplier to −495V for red, to −535V for green and to −575V for blue.

In the fifth example, the color balance of the whole system of the optical write head 20 is set for exposure of the print sheet 4, that is, to match the spectral sensitivity of the print sheet 4, and at the time of light-quantity measurement, the output signal of the sensor 72 is converted to match the spectral sensitivity of the print sheet 4.

Figure 33:
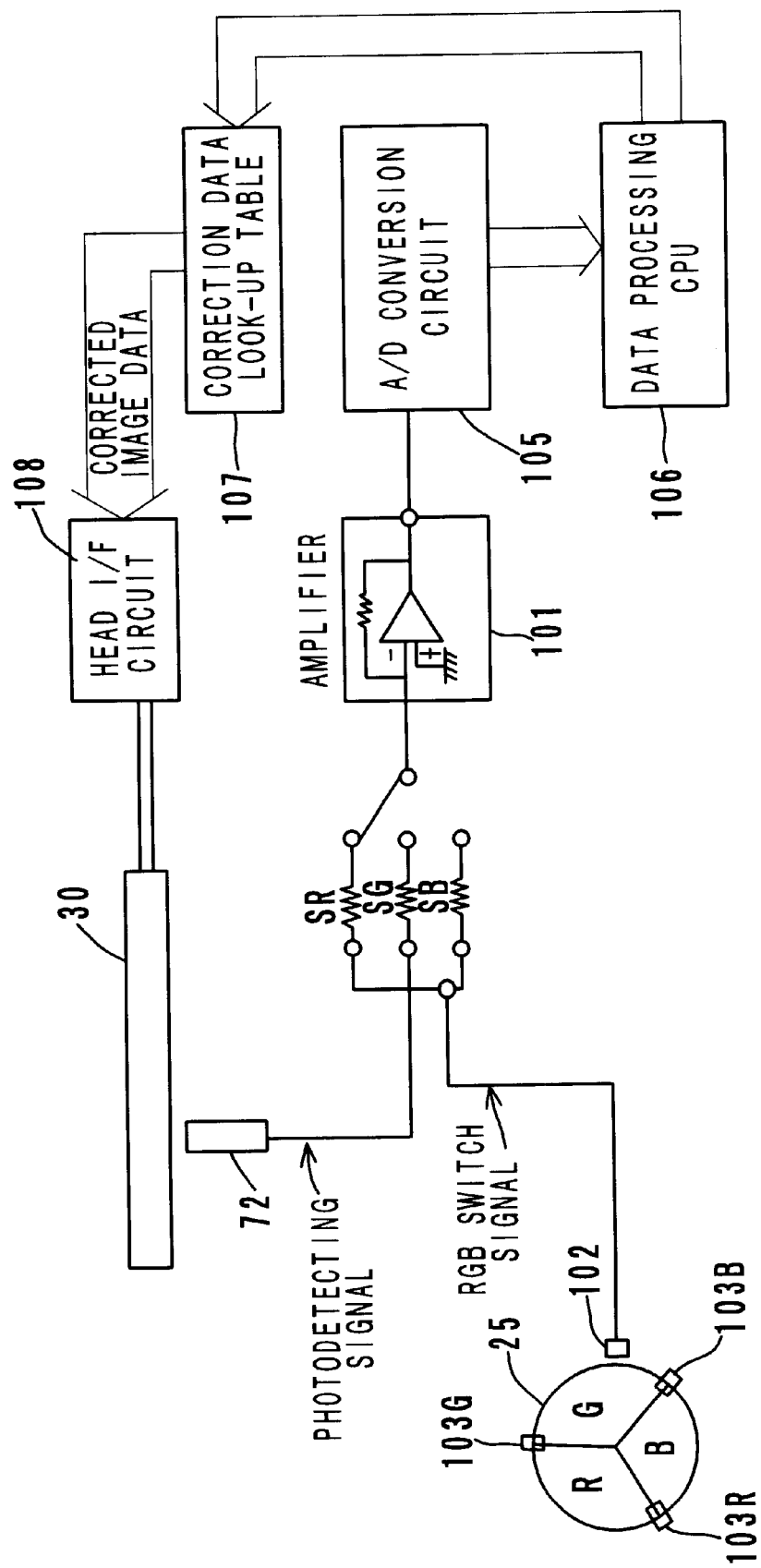
FIG. 33 is a block diagram of a light-quantity measurement/correction circuit according to a fifth example of making up the difference in spectral sensitivity between the print sheet and the sensor.

Specifically, as shown in FIG. 33, resisters SR, SG and SB and an analog switch are provided between the sensor 72 and an amplifier 101, and either one of the resisters SR, SG and SB is connected to the circuit by the analog switch in accordance with an RGB switch signal outputted from a photointerrupter 102. The photointerrupter 102 detects actuators 103R, 103G and 103B provided around the RGB filter 25 and recognizes the light color accordingly. By the selection of a register from SR, SG and SB made by the analog switch, the amplifying constant (resistance) of the amplifier 101 is switched for each of the colors, and in this way, suitable color balance can be realized.

A signal outputted from the amplifier 101 is sent to a CPU 106 via an A/D conversion circuit 105, and correction data are produced in the CPU 106. The correction data are stored in a look-up table 107 in a RAM. Then, corrections are made to image data referring to the look-up table 107, and the corrected image data are transmitted to a head I/F circuit 108 so that the light shutter module 30 can be driven in accordance with the image data.

Other Embodiments

As well as the PLZT light shutter array, LEDs (light emitting diodes), LCSs (liquid crystal shutters), a DMD (deformable mirror device), an FLD (fluorescent device), etc. can be used as the optical array of an optical write head.

Further, the present invention is applicable to an optical write device which writes an image on a silver-salt film or on an electrophotographic photosensitive member and to an image projector which projects an image onto a display as well as to an optical write device which writes an image on a silver-salt print sheet.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method for determining an output characteristic of an optical write device which drives a plurality of optical elements arranged in a main scanning direction individually in accordance with image data, the method comprising the steps of:

driving the plurality of optical elements for reproduction of at least three different tone levels;

measuring quantities of light outputted from each of the optical elements at each of the tone levels separately with a sensor; and calculating an expression which indicates an output characteristic of each of the optical elements from measured values.

2. The method claimed in claim 1, wherein:

a voltage which makes many of the optical elements output their respective maximum quantities of light at a duty of 50% is determined prior to the light-quantity measuring step; and during the light-quantity measuring step, the optical elements are driven with the voltage applied thereto.

3. The method claimed in claim 1, wherein the number of tone levels at which the light-quantity measurement is carried out depends on a form of the expression to be calculated.

4. The method claimed in claim 3, wherein the tone levels at which the light-quantity measurement is carried out are near points of inflection of actual output characteristic curves of the optical elements.

5. The method claimed in claim 1, wherein said step of measuring quantities of light further includes the steps of:

measuring quantities of light from odd numbered optical elements while said driver repeatedly turns on and off only the odd numbered optical elements, thus producing a plurality of measurement quantities for each odd numbered optical element; and measuring quantities of light from even numbered optical elements while said driver repeatedly turns on and off only the even numbered optical elements, thus producing a plurality of measurement quantities for each even numbered optical element.

6. The method claimed in claim 5, wherein said step of calculating an expression further includes the steps of:

integrating the plurality of measurement quantities for each odd numbered optical element; and integrating the plurality of measurement quantities for each even numbered optical element.

7. The method claimed in claim 6, wherein said driving step, said measuring step and said calculating step are repeated for a plurality of colors of light which are provided by said optical write device.

8. The method claimed in claim 1, further comprising the step of determining the location of each optical element, which comprises the steps of:

driving one of odd numbered optical elements and even numbered optical elements to their maximum value while turning off the other one of even numbered optical elements or odd numbered optical elements;

detecting a position of the driven optical elements to be a position at which the sensor senses maximum quantities of light; and detecting a position of the optical elements which are turned off to be the position which is the midpoint between two adjacent detected odd numbered optical elements.

9. An optical write device which individually drives a plurality of optical elements arranged in a main scanning direction, in accordance with data about three primary colors to expose a recording medium with light signals of three different colors to form a color image thereon, each of said plurality of optical elements being capable of outputting the light signals of the three different colors, the device comprising:

a light-quantity measuring device having a photosensor for measuring a quantity of each of the three different colors of light outputted from each of the optical elements; and an adjusting unit which makes up a difference in spectral sensitivity characteristic between the photosensor and the recording medium, wherein said adjusting unit alternates an exposure condition between a first condition and a second condition, the first condition being for measuring the quantity of light outputted from each of the optical elements by said photosensor, the second condition being for exposing the recording medium by the optical elements.

10. The optical write device as claimed in claim 9, wherein the adjusting unit includes a color filter provided in a light source section.

11. The optical write device as claimed in claim 9, wherein the adjusting unit makes a light source emit light with different intensities in emitting the respective colors.

12. The optical write device as claimed in claim 9, wherein the adjusting unit makes the photosensor have different sensitivities in receiving the respective colors.

13. An image forming apparatus capable of forming an image having at most p tone levels, p being a natural number, said image forming apparatus comprising:

at least one light signal emitter;

a driver which is connected to said light signal emitter so as to drive said light signal emitter in accordance with driving image data;

a light-quantity detector which detects quantities of light emitted from the light signal emitter, the light-quantity detector separately detecting a plurality of quantities of light emitted from the light signal emitter which is driven for reproduction of q tone levels, q being a natural number larger than 2 but smaller than p; and a controller comprising:

a first control section which calculates an output characteristic of the light signal emitter based on the quantities of light of the q tone levels detected by the light-quantity detector and which stores the output characteristic in a memory; and a second control section which inputs image data and generates the driving image data based on the inputted image data and the output characteristic stored in the memory.

14. The image forming apparatus as claimed in claim 13, wherein the first control section of said controller calculates the output characteristic by using a least-square method.

15. The image forming apparatus as claimed in claim 13, wherein the first control section of said controller calculates an n-degree curve based on the quantities of light detected by said light-quantity detector as the output characteristic, n being the largest exponent value in an expression which defines the n-degree curve.

16. The image forming apparatus as claimed in claim 15, wherein the number q is at least n+1.

17. The image forming apparatus as claimed in claim 15, wherein at least one tone level at which the quantity of light is detected by said light-quantity detector is near a point of inflection of the n-degree curve.

18. The image forming apparatus as claimed in claim 13, wherein:

said image forming apparatus has a plurality of light signal emitters; and the first control section of said controller calculates respective output characteristics of the light signal emitters.

19. An image forming apparatus capable of forming an image having at most p tone levels, p being a natural number, said image forming apparatus comprising:

at least one light signal emitter;

a driver which is connected to said light signal emitter so as to drive said light signal emitter in accordance with driving image data;

a memory which stores an output characteristic of the light signal emitter which is calculated based on a plurality of quantities of light separately emitted from the light signal emitter for reproduction of q tone levels, q being a natural number larger than 2 but smaller than p; and a controller which inputs image data and generates the driving image data based on the inputted image data and the output characteristic stored in the memory.

20. The image forming apparatus as claimed in claim 19, wherein the output characteristic is calculated by using a least-square method.

21. The image forming apparatus as claimed in claim 19, wherein the output characteristic is an n-degree curve, n being the largest exponent value in an expression which defines the n-degree curve.

22. The image forming apparatus as claimed in claim 19, wherein:

said image forming apparatus has a plurality of light signal emitters; and said memory stores respective output characteristics of the light signal emitters.

23. An apparatus for determining an output characteristic of an optical write device which drives a plurality of optical elements arranged in a main scanning direction individually in accordance with image data, the apparatus comprising:

a driver which drives the plurality optical elements for providing at least three different tone levels;

a measuring device which measures quantities of light outputted from each of the optical elements at each of the tone levels; and a processor which calculates an expression which indicates an output characteristic of each of the optical elements from measured values.

24. The apparatus claimed in claim 23, wherein said measuring device measures quantities of light from odd numbered optical elements while said driver repeatedly turns on and off only the odd numbered optical elements, thus producing a plurality of measurement quantities for each odd numbered optical element; and wherein said measuring device measures quantities of light from even numbered optical elements while said driver repeatedly turns on and off only the even numbered optical elements, thus producing a plurality of measurement quantities for each even numbered optical element.

25. The apparatus claimed in claim 24, wherein said processor calculates an expression by integrating the plurality of measurement quantities for each odd numbered optical element; and by integrating the plurality of measurement quantities for each even numbered optical element.

26. The apparatus claimed in claim 23, wherein said measuring device further determines the location of each optical element by driving one of odd numbered optical elements and even numbered optical elements to their maximum value while turning off the other one of even numbered optical elements or odd numbered optical elements, detecting a position of the driven optical elements to be the position at which the sensor senses maximum quantities of light, and detecting a position of the optical elements which are turned off to be the position which is the midpoint between two adjacent detected odd numbered optical elements.

* * * * *